(12) United States Patent
Ono et al.

(10) Patent No.: US 9,862,621 B2
(45) Date of Patent: Jan. 9, 2018

(54) DESALINATION APPARATUS AND DESALINATION METHOD

(71) Applicant: Panasonic Intellectual Property Management Co., Ltd., Osaka (JP)

(72) Inventors: Atsushi Ono, Kyoto (JP); Hisaaki Gyoten, Osaka (JP); Norihisa Mino, Osaka (JP); Morio Tomiyama, Nara (JP); Akira Taomoto, Kyoto (JP); Stephen William John, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 523 days.

(21) Appl. No.: 14/551,138

(22) Filed: Nov. 24, 2014

(65) Prior Publication Data

US 2015/0075966 A1    Mar. 19, 2015

Related U.S. Application Data

(63) Continuation of application No. PCT/JP2014/001605, filed on Mar. 20, 2014.

(30) Foreign Application Priority Data

Mar. 29, 2013    (JP) .................................. 2013-074359

(51) Int. Cl.
*C02F 1/04*    (2006.01)
*C02F 1/08*    (2006.01)
(Continued)

(52) U.S. Cl.
CPC ................. *C02F 1/08* (2013.01); *B01D 1/00* (2013.01); *B01D 1/0064* (2013.01); *C02F 1/043* (2013.01); *C02F 2103/08* (2013.01)

(58) Field of Classification Search
CPC .. C02F 1/008; C02F 1/042; C02F 1/08; C02F 1/14; B01D 1/0005; B01D 1/0035;
(Continued)

(56) References Cited

U.S. PATENT DOCUMENTS 3,803,031 A * 4/1974 Keller, Jr. .......... B01D 17/0202
                                                                210/662
5,270,080 A    12/1993 Mino et al.
(Continued)

FOREIGN PATENT DOCUMENTS

JP    60-013206    1/1985
JP    07-063670    7/1995
WO    2012/060036   5/2012

OTHER PUBLICATIONS

International Search Report dated May 13, 2014 in International (PCT) Application No. PCT/JP2014/001605.

*Primary Examiner* — Brian McCaig
(74) *Attorney, Agent, or Firm* — Wenderoth, Lind & Ponack, L.L.P.

(57) ABSTRACT

A desalination apparatus that includes: a water-repellent particle layer that is located below a water tank, contains water-repellent particles, and allows passage of water vapor generated by evaporation of the liquid stored in the water tank, the water tank being a space for storing the liquid; and a liquefying layer that is located below the water-repellent particle layer, and liquefies the water vapor that has passed through the water-repellent particle layer to obtain the fresh water. The water-repellent particle layer includes: a first layer that contains first water-repellent particles among the water-repellent particles, and faces the water tank; and a second layer that contains second water-repellent particles among the water-repellent particles, and is provided below
(Continued)

the first layer. The second water-repellent particles have a larger average particle size than the first water-repellent particles.

5 Claims, 18 Drawing Sheets

(51) Int. Cl.
  *B01D 1/00* (2006.01)
  *C02F 103/08* (2006.01)
(58) Field of Classification Search
  CPC .... B01D 1/0076; B01D 1/0082; B01D 5/006; Y02W 10/37
  See application file for complete search history.

(56) References Cited

U.S. PATENT DOCUMENTS

| 8,652,303 B2 | 2/2014 | Mino et al. |
| 2002/0121481 A1* | 9/2002 | Peterson ................. B01J 20/20 210/673 |
| 2012/0138448 A1 | 6/2012 | Mino et al. |

\* cited by examiner

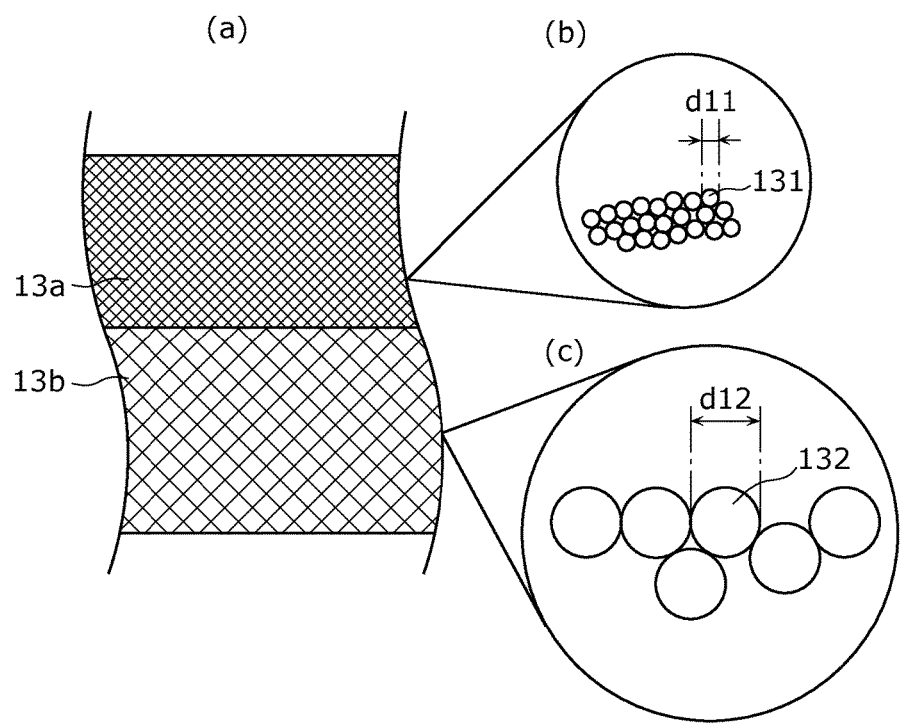

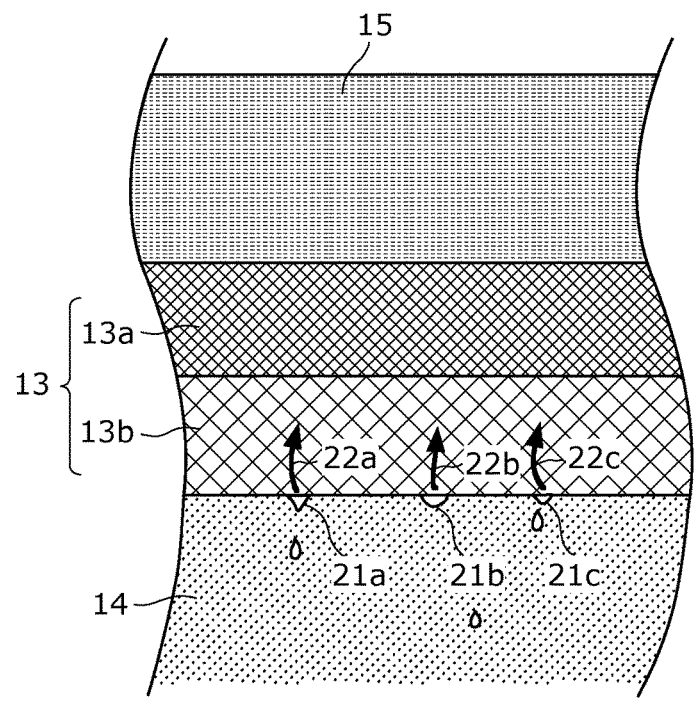
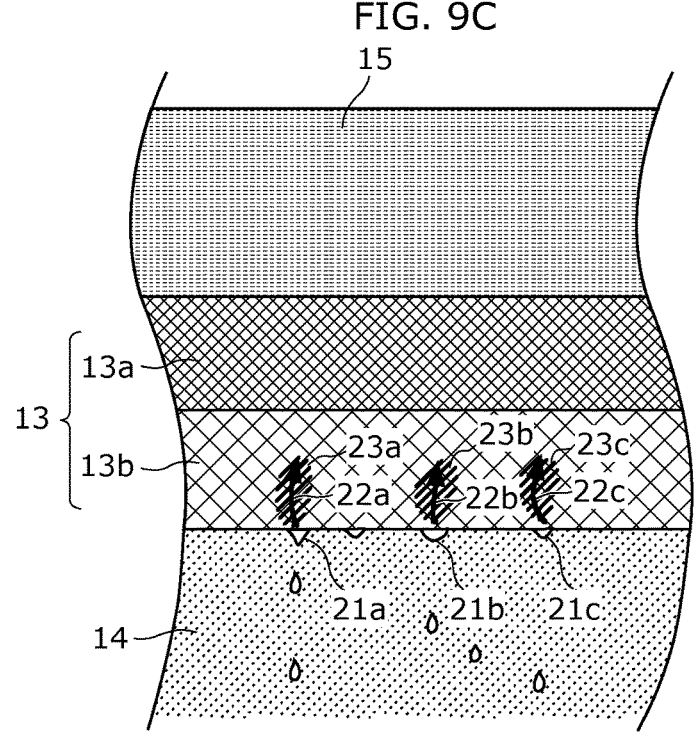

DESALINATION APPARATUS AND DESALINATION METHOD

CROSS REFERENCE TO RELATED APPLICATIONS

This is a continuation application of PCT International Application No. PCT/JP2014/001605 filed on Mar. 20, 2014, designating the United States of America, which is based on and claims priority of Japanese Patent Application No. 2013-074359 filed on Mar. 29, 2013. The entire disclosures of the above-identified applications, including the specifications, drawings and claims are incorporated herein by reference in their entirety.

FIELD

One or more exemplary embodiments disclosed herein relate generally to a desalination apparatus and a desalination method for obtaining fresh water from a liquid.

BACKGROUND

As a technique for generating fresh water at locations where such water is not easily available, the one of generating fresh water from seawater has been known. For example, Patent Literature (PTL) 1 discloses a desalinating method using water-repellent particles.

CITATION LIST

Patent Literature

[PTL 1] WO2012/060036

SUMMARY

Technical Problem

However, in the method of the background art, a water path vertically penetrating a water-repellent particle layer may be formed with the progress of a desalination process. If such a water path is formed, seawater may pass through the water path, so that there is a possibility that desalination cannot be performed.

One non-limiting and exemplary embodiment provides a desalination apparatus and a desalination method that alleviate the problem of desalination being impossible.

Solution to Problem

In one general aspect, the techniques disclosed here feature a desalination apparatus that obtains fresh water from a liquid. The desalination apparatus includes: a water-repellent particle layer that is located below a reservoir layer, contains a plurality of water-repellent particles, and allows passage of water vapor generated by evaporation of the liquid stored in the reservoir layer, the reservoir layer being a space for storing the liquid; and a liquefying layer that is located below the water-repellent particle layer, and liquefies the water vapor that has passed through the water-repellent particle layer to obtain the fresh water. The water-repellent particle layer includes: a first layer that contains a plurality of first water-repellent particles among the plurality of water-repellent particles, and faces the reservoir layer; and a second layer that contains a plurality of second water-repellent particles among the plurality of water-repellent particles, and is provided below the first layer. An average particle size of the plurality of second water-repellent particles is larger than an average particle size of the plurality of first water-repellent particles.

It should be noted that these generic aspects or specific aspects serving as a part thereof may be implemented by a system, a method, an integrated circuit, a computer program or a computer-readable recording medium such as a CD-ROM, or by an arbitrary combination of a system, a method, an integrated circuit, a computer program and a recording medium.

General and specific aspect disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The desalination apparatus and the desalination method according to one or more exemplary embodiments or features disclosed herein can alleviate the problem of desalination being impossible.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 5 illustrates a detailed configuration of a water-repellent particle layer in Embodiment 1.

FIG. 6 is a table indicating different properties of the water-repellent particle layer with respect to different particle sizes of a plurality of water-repellent particles forming the water-repellent particle layer.

FIG. 9B is a sectional view illustrating the major portion of the desalination apparatus for describing an example of how the moisture moves in the water-repellent particle layer in Embodiment 1.

FIG. 9C is a sectional view illustrating the major portion of the desalination apparatus for describing an example of how the moisture moves in the water-repellent particle layer in Embodiment 1.

DESCRIPTION OF EMBODIMENTS

In the present description, "water repellency" means a property of rejecting water.

(Underlying Knowledge Forming Basis of the Present Disclosure)

Before the description of embodiments, the underlying knowledge forming basis of the present disclosure will be described first with reference to a desalination apparatus in a comparative example.

Figure 1:
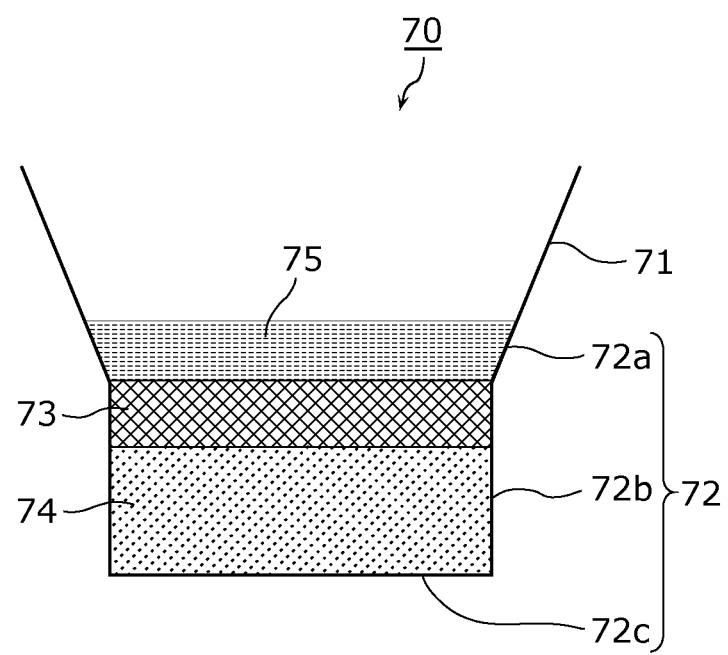
FIG. 1 is a sectional view illustrating a configuration of a desalination apparatus in a comparative example.

FIG. 1 is a sectional view illustrating a configuration of the desalination apparatus in the comparative example.

A desalination apparatus 70 in the comparative example includes a water tank 71, a water-repellent particle layer 73 and a liquefying layer 74. The desalination apparatus 70 illustrated in FIG. 1 is constituted by a vessel 72 with an upper side wall 72a, a lower side wall 72b and a base plate 72c. In FIG. 1, the water tank 71, the water-repellent particle layer 73 and the liquefying layer 74 are provided inside the vessel 72 in this order from above.

In the desalination apparatus 70, a liquid stored in the water tank 71 (a liquid layer 75) is evaporated to be water vapor. The water vapor passes through the water-repellent particle layer 73.

The water vapor that has passed through the water-repellent particle layer 73 is liquefied in the liquefying layer 74 so as to become water (fresh water).

The water-repellent particle layer 73 is formed of a large number of water-repellent particles that are clustered together. The surface of one water-repellent particle is in contact with the surfaces of other water-repellent particles. Each of the water-repellent particles includes a particle and a water-repellent film coating the particle surface, and has water repellency. Also, between the water-repellent particles that are in contact with each other, the water-repellent particle layer 73 has a gap through which the water vapor obtained by evaporating the liquid can pass.

The inventors have gained the following knowledge. That is, with the progress of the desalination process in the above-described desalination apparatus 70, the fresh water (moisture) enters the water-repellent particle layer 73 so as to increase an amount of water vapor in the water-repellent particle layer 73. The increased water vapor and the condensation from this water vapor cause a water path vertically penetrating the water-repellent particle layer 73 to be formed. Here, the "water path" means a passage for the liquid. FIGS. 2A to 2E are sectional views illustrating a major portion of the desalination apparatus 70 for describing an example of how the moisture moves in the water-repellent particle layer 73. Incidentally, FIGS. 2A to 2E are enlarged sectional views illustrating the water-repellent particle layer 73 and the vicinity thereof in the desalination apparatus 70.

<FIG. 2A>

Figure 2A:
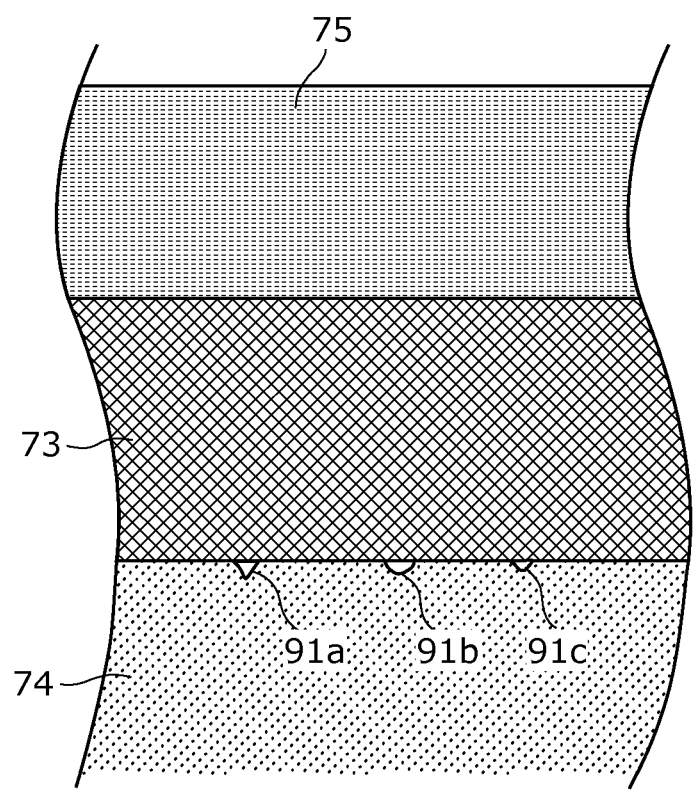
FIG. 2A is a sectional view illustrating a major portion of the desalination apparatus for describing an example of how moisture moves in a water-repellent particle layer in the comparative example.

FIG. 2A illustrates a state immediately after the desalination process is started and the fresh water is obtained in the desalination apparatus according to the comparative example.

As illustrated in this figure, the desalination process is started and the water vapor is liquefied by the liquefying layer 74, so that drops 91a to 91c of fresh water are obtained. Thus obtained fresh water drops to the bottom surface of the liquefying layer 74.

<FIG. 2B>

Figure 2B:
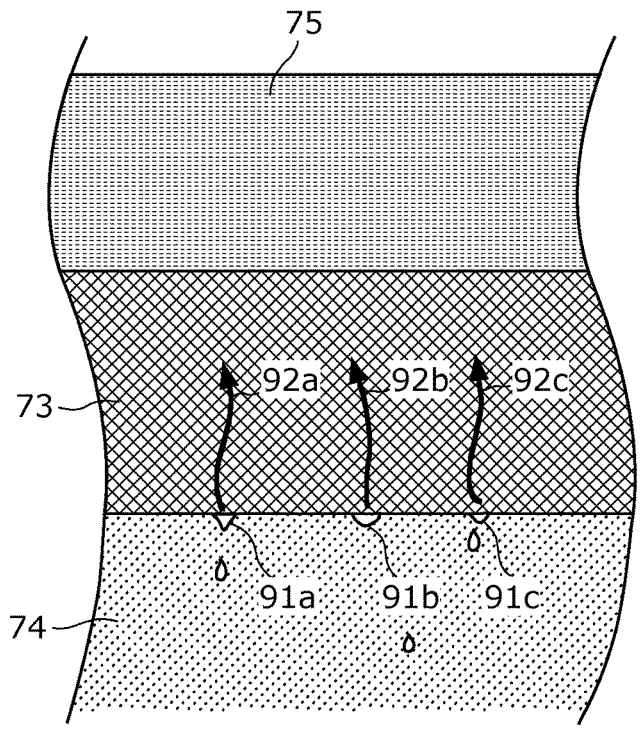
FIG. 2B is a sectional view illustrating the major portion of the desalination apparatus for describing an example of how the moisture moves in the water-repellent particle layer in the comparative example.

FIG. 2B illustrates how the fresh water generated on a lower surface of the water-repellent particle layer 73 in the state of FIG. 2A enters inside of the water-repellent particle layer 73 by a capillary force of the water-repellent particle layer 73.

At least a part of the water drops 91a to 91c generated on the lower surface of the water-repellent particle layer 73 sometimes enters the inside of the water-repellent particle layer 73 by capillary forces 92a to 92c of the water-repellent particle layer 73. In other words, moisture enters the inside of the water-repellent particle layer 73 in some cases.

The length of arrows indicated as the capillary forces 92a to 92c in the sheet of paper schematically illustrates how deep the moisture enters the water-repellent particle layer 73 by the capillary forces 92a to 92c. It should be noted that the "capillary force" is a force that lifts the water drops 91a to 91c (moisture) on the lower surface of the water-repellent particle layer 73 by capillarity. The water drops 91a to 91c (moisture) on the lower surface of the water-repellent particle layer 73 enter the water-repellent particle layer 73 more deeply with an increase in the capillary force. Now, the capillarity occurring in the water-repellent particle layer 73 will be explained.

As described above, the water-repellent particle layer 73 is formed of a large number of water-repellent particles that are clustered together, and the surface of one water-repellent particle is in contact with the surfaces of other water-repellent particles. In such a water-repellent particle layer 73, a slight gap is formed between the water-repellent particles that are in contact with each other. Accordingly, the gaps formed inside the water-repellent particle layer 73 are strung together so as to form a large number of fine tubes vertically extending inside the water-repellent particle layer 73. A part of end portions of a large number of such fine tubes is exposed to the lower surface of the water-repellent particle layer 73. Thus, at least a part of the water drops 91a to 91c generated on the lower surface of the water-repellent particle layer 73 sometimes rises through these fine tubes and enters the inside of the water-repellent particle layer 73.

As described above, the moisture sometimes enters the inside of the water-repellent particle layer 73 from the lower surface of the water-repellent particle layer 73 by the capillarity that occurs in the water-repellent particle layer 73.

<FIG. 2C>

Figure 2C:
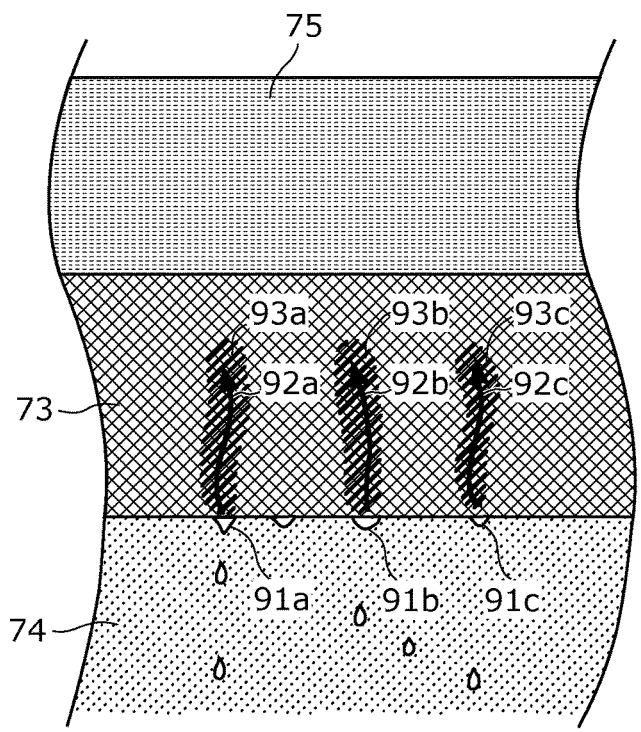
FIG. 2C is a sectional view illustrating the major portion of the desalination apparatus for describing an example of how the moisture moves in the water-repellent particle layer in the comparative example.

FIG. 2C schematically illustrates how the water-repellent particles inside the water-repellent particle layer 73 are dampened by the moisture that has entered the inside of the water-repellent particle layer 73 illustrated in FIG. 2B.

As illustrated in this figure, the moisture that has entered the inside of the water-repellent particle layer 73 by the capillarity condenses inside the water-repellent particle layer 73 and raises the humidity inside the water-repellent particle layer 73. In other words, the moisture dampens the water-repellent particles inside the water-repellent particle layer 73. Accordingly, groups 93a to 93c of damp water-repellent particles are present inside the water-repellent particle layer 73.

More specifically, the moisture that has entered the inside of the water-repellent particle layer 73 by the capillarity condenses or is evaporated to be water vapor depending on the temperature, etc. inside the water-repellent particle layer 73. In either case, the water-repellent particles inside the water-repellent particle layer 73 are more damp than those in the case where no moisture enters the inside of the water-repellent particle layer 73 by the capillarity, and the groups 93a to 93c of damp water-repellent particles are formed.

<FIG. 2D>

Figure 2D:
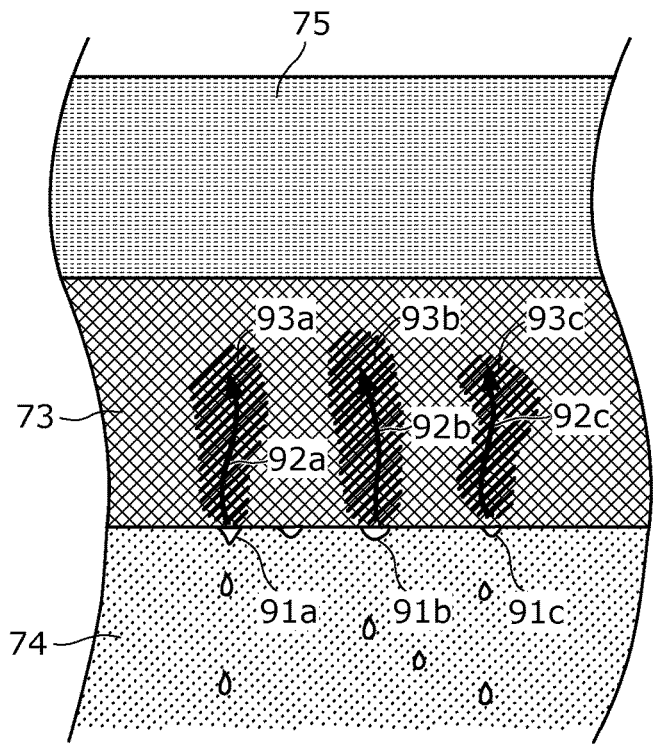
FIG. 2D is a sectional view illustrating the major portion of the desalination apparatus for describing an example of how the moisture moves in the water-repellent particle layer in the comparative example.

FIG. 2D schematically illustrates how the water-repellent particles inside the water-repellent particle layer 73 are further dampened after further progress of the desalination process from the state of FIG. 2C.

As illustrated in this figure, with the further progress of the desalination process, the water-repellent particles inside the water-repellent particle layer 73 are dampened further, and the number of the damp water-repellent particles increases. In other words, the groups 93a to 93c of the damp water-repellent particles are enlarged.

<FIG. 2E>

Figure 2E:
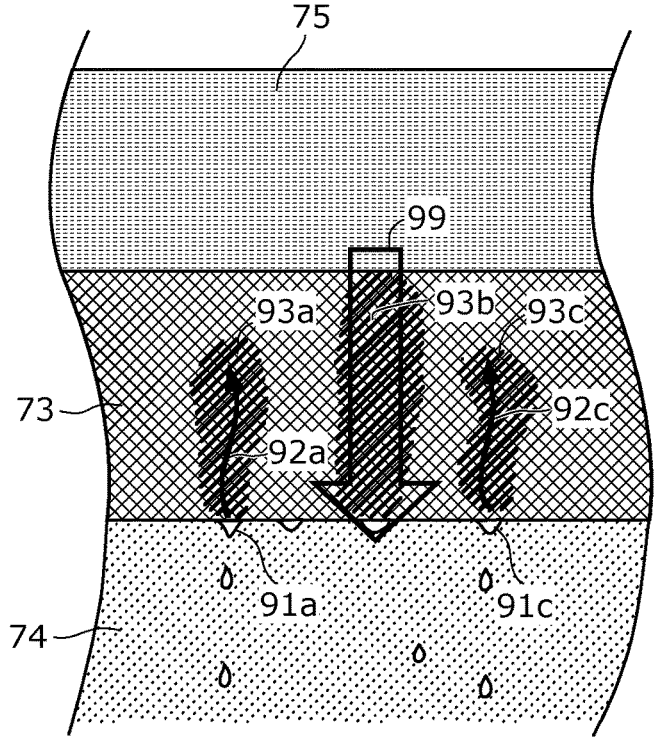
FIG. 2E is a sectional view illustrating the major portion of the desalination apparatus for describing an example of how the moisture moves in the water-repellent particle layer in the comparative example.

FIG. 2E schematically illustrates how a water path 99 is formed in the water-repellent particle layer 73 after further progress of the desalination process from the state of FIG. 2D.

As illustrated in this figure, with the further progress of the desalination process, the water-repellent particles inside the water-repellent particle layer 73 are dampened further, and the number of the damp water-repellent particles increases. In other words, the groups 93a to 93c of the damp water-repellent particles are enlarged. As a result, the group 93b of the damp water-repellent particles reaches an upper surface of the water-repellent particle layer 73. In other words, the group 93b of the damp water-repellent particles vertically penetrates the water-repellent particle layer 73. In this way, the water path 99 vertically penetrating the water-repellent particle layer 73 is formed.

When such a water path 99 is formed, there is a possibility that the liquid in the liquid layer 75 that is not evaporated and remains in a liquid state may pass through this water path 99 and flow into the liquefying layer 74. In other words, if the water path 99 is formed, there is a possibility that the desalination cannot be performed. Thus, it is beneficial to suppress the formation of the water path 99 in the progress of the desalination process.

As described above, the inventors have gained the knowledge that, in the desalination apparatus 70 according to the comparative example, the water path 99 vertically penetrating the water-repellent particle layer 73 is formed by the capillarity occurring in the water-repellent particle layer 73 with the progress of the desalination process.

Also, the inventors have gained the knowledge that the water path 99 is formed more easily when the desalination apparatus 70 has the following configurations.

In the desalination apparatus 70 using the water-repellent particle layer 73 containing a plurality of water-repellent particles, the configuration is sometimes adopted in which the desalination efficiency is enhanced by raising the temperature of the liquid layer 75 and lowering the temperature of the liquefying layer 74.

In such a case, for example, in order to raise the temperature of the liquid layer 75, a heater is disposed in the water tank 71, or the liquid layer 75 stored in the water tank 71 is heated by solar heat. Also, for example, in order to lower the temperature of the liquefying layer 74, a chiller is disposed in the liquefying layer 74, or the lower side wall 72b of the vessel 72 is buried in a recessed portion formed in the ground so that the liquefying layer 74 is cooled by geothermal heat This intends to raise the temperature of the liquid at an interface between the water-repellent particle layer 73 and the liquid layer 75 by raising the temperature of the liquid and to lower the temperature at an interface between the water-repellent particle layer 73 and the liquefying layer 74 by lowering the temperature of the liquefying layer 74. In other words, this is for raising saturation vapor pressure of the liquid at the interface between the water-repellent particle layer 73 and the liquid layer 75 and lowering saturation vapor pressure of the fresh water at the interface between the water-repellent particle layer 73 and the liquefying layer 74. In this way, it is possible to increase the amount of water vapor passing through the water-repellent particle layer 73 so as to increase the amount of the fresh water that condenses (is liquefied) at the interface between the water-repellent particle layer 73 and the liquefying layer 74. Thus, the amount of the fresh water obtained in the liquefying layer 74 can be increased. In other words, the desalination efficiency can be enhanced.

However, when the desalination efficiency is enhanced by raising the temperature of the liquid layer 75 and lowering the temperature of the liquefying layer 74 as described above, the amount of the fresh water generated at the interface between the water-repellent particle layer 73 and the liquefying layer 74 increases. Put another way, in this case, the amount of the fresh water generated on the lower surface of the water-repellent particle layer 73 increases.

Here, when the amount of the fresh water (water drops) generated on the lower surface of the water-repellent particle layer 73 is small, the amount of the moisture entering the inside of the water-repellent particle layer 73 by the capillarity described above is also small. On the other hand, when the amount of the fresh water (water drops) generated on the lower surface of the water-repellent particle layer 73 increases, the amount of the moisture entering the inside of the water-repellent particle layer 73 by the capillarity described above may also increase.

Thus, when the desalination efficiency is enhanced, the water path 99 is formed more easily by the capillarity occurring in the water-repellent particle layer 73. Accordingly, especially in the enhancement of the desalination efficiency, it is beneficial to suppress the formation of the water path 99 by the capillarity occurring in the water-repellent particle layer 73.

In view of the above, the inventors have come to an inventive concept that helps to prevent the water path from being formed by the capillarity occurring in the water-repellent particle layer.

According to an exemplary embodiment disclosed herein, a desalination apparatus obtains fresh water from a liquid. The desalination apparatus includes: a water-repellent particle layer that is located below a reservoir layer, contains a plurality of water-repellent particles, and allows passage of water vapor generated by evaporation of the liquid stored in the reservoir layer, the reservoir layer being a space for storing the liquid; and a liquefying layer that is located below the water-repellent particle layer, and liquefies the water vapor that has passed through the water-repellent particle layer to obtain the fresh water. The water-repellent particle layer includes: a first layer that contains a plurality of first water-repellent particles among the plurality of water-repellent particles, and faces the reservoir layer; and a second layer that contains a plurality of second water-repellent particles among the plurality of water-repellent particles, and is provided below the first layer. An average particle size of the plurality of second water-repellent particles is larger than an average particle size of the plurality of first water-repellent particles.

The water-repellent particle layer includes the second layer facing the liquefying layer and containing the plurality of second water-repellent particles with a larger average particle size as described above, so that the formation of the water path in the water-repellent particle layer can be suppressed. This, as a result, helps to prevent the liquid in the liquid layer that is not evaporated and remains in a liquid state from passing through the water path and thus flowing into the liquefying layer. In other words, it is possible to reduce the possibility that the desalination cannot be performed.

Additionally, the water-repellent particle layer includes the first layer facing the reservoir layer and containing the plurality of first water-repellent particles with a smaller average particle size, making it possible to secure water bearing pressure.

For example, the water-repellent particle layer may further include a third layer that contains a plurality of third water-repellent particles among the plurality of water-repellent particles, and is provided below the second layer, and an average particle size of the plurality of third water-repellent particles may be larger than the average particle size of the plurality of second water-repellent particles.

This makes it possible to further suppress the formation of the water path.

Also, for example, the water-repellent particle layer may be a stack of layer sets each including the first layer and the second layer.

It should be appreciated that these generic or specific aspects may be implemented as a desalination method that uses the desalination apparatus described above to obtain fresh water from a liquid.

The following is a description of a desalination apparatus and a desalination method according to embodiments disclosed herein, with reference to the accompanying drawings. It should be noted that each figure is drawn schematically and not always illustrated strictly.

Furthermore, any embodiment described below will illustrate a generic or specific example. The numerical values, shapes, structural components, the arrangement of the structural components, steps and the order of the steps mentioned in the following embodiments are merely an example and not intended to limit the present disclosure. Moreover, among the structural components in the following embodiments, the one that is not recited in any independent claim exhibiting the most generic concept will be described as an arbitrary structural component.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

[Desalination Apparatus]

Figure 3:
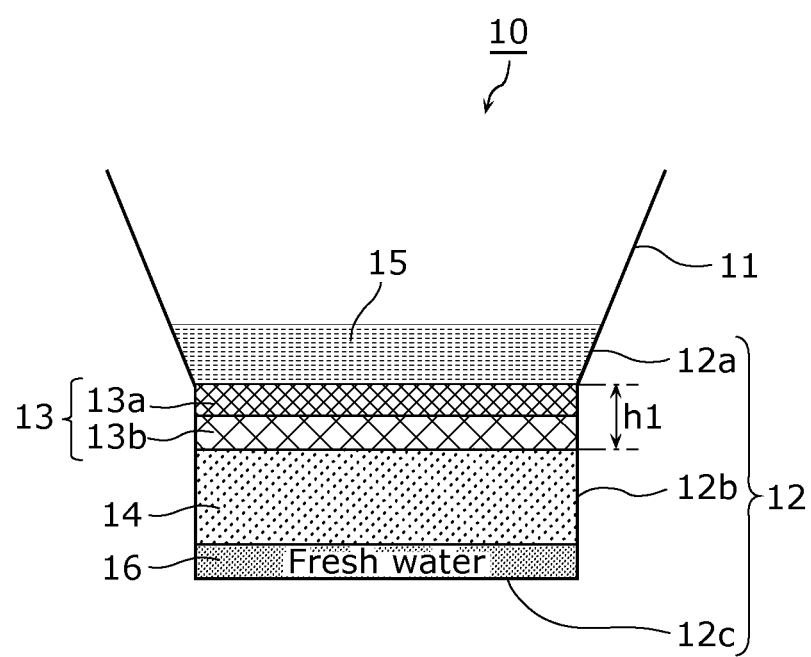
FIG. 3 is a sectional view illustrating an exemplary configuration of a desalination apparatus according to Embodiment 1.

The following describes a desalination apparatus 10 with a basic configuration and a desalination process thereof with reference to the drawings before describing a desalination system according to Embodiment 1. FIG. 3 is a sectional view illustrating a configuration of the desalination apparatus 10.

The desalination apparatus 10 shown in FIG. 3 includes a water tank 11, a water-repellent particle layer 13 and a liquefying layer 14. The water tank 11, the water-repellent particle layer 13 and the liquefying layer 14 are located in this order from above. Here, the water tank 11 has a lateral surface surrounded by an upper side wall 12a of a vessel 12 and a bottom surface covered with the water-repellent particle layer 13, such that a space for storing a liquid (a reservoir layer) is defined therein.

<Water Tank 11>

The water tank 11 may have any shape such as a rectangle or a circle when seen from a plan view (a top view). The lateral surface of the water tank 11 is formed of the upper side wall 12a of the vessel 12, and the bottom surface thereof is formed of an upper surface of the water-repellent particle layer 13.

Here, the vessel 12 will be described. The vessel 12 shown in FIG. 3 includes a lower side wall 12b that extends vertically, the upper side wall 12a that is connected to the lower side wall 12b and inclined so as to expand upwardly, and a base plate 12c that is connected to the lower side wall 12b. The upper side wall 12a is not necessarily inclined so as to expand upwardly, but may extend vertically similarly to the lower side wall 12b. However, since the upper side wall 12a sometimes corresponds to a flow channel of a liquid when the liquid is introduced to the water tank 11, it is favorable that the upper side wall 12a be inclined so as to expand upwardly in order to reduce energy of the liquid to be introduced to the water tank 11.

The vessel 12 is formed such that the upper side wall 12a, the lower side wall 12b and the base plate 12c surround surfaces other than an upper surface of the water tank 11.

In a lower portion of the vessel 12, lateral portions of the water-repellent particle layer 13 and the liquefying layer 14 described later are entirely surrounded by the lower side wall 12b, and a bottom surface of the liquefying layer 14 is held by the base plate 12c. The vessel 12 allows fresh water 16 obtained by desalination to be held in the liquefying layer 14.

Each of the lower side wall 12b and the upper side wall 12a is formed of a water repellent material. An exemplary material for each of the lower side wall 12b and the upper side wall 12a is a metal sheet, concrete, a waterproof sheet or clay. Incidentally, the lower side wall 12b and the upper side wall 12a may be formed of a material different from the above, for example, a resin, cement or soil.

As described above, the vessel 12 has a shape of a bottomed tube, includes the upper side wall 12a that has a tubular shape whose upper opening is larger than its lower opening, the lower side wall 12b that has a tubular shape whose upper opening contacts the lower opening of the upper side wall 12a, and the base plate 12c that closes a lower opening of the lower side wall 12b, and receives the water tank 11, the water-repellent particle layer 13 and the liquefying layer 14 therein. Incidentally, the vessel 12 is not limited to the shape of a bottomed tube, but may be provided, for example, as a recessed portion dug in the ground, in which the water tank 11, the water-repellent particle layer 13 and the liquefying layer 14 are located. Also, the lower side wall 12b and the upper side wall 12a are not limited to have a water repellency but may have a water proof property.

The liquid poured (introduced) into the water tank 11 forms the liquid layer 15 in the water tank 11. In other words, the liquid forms the liquid layer 15 above the upper surface of the water-repellent particle layer 13 and inside the vessel 12 (a space surrounded by the upper side wall 12a).

It is noted that the desalination apparatus 10 may have an introduction passage for introducing the liquid to the water tank 11. On the other hand, when the desalination apparatus 10 does not have the introduction passage, the liquid may be introduced into the water tank 11 from an opening of the water tank 11 (an opening of the vessel 12). Here, the liquid to be introduced to the water tank 11 is transparent or translucent, for example.

The liquid that has been poured into the water tank 11 and formed the liquid layer 15 does not fall down to the liquefying layer 14 because the water-repellent particle layer 13 and the upper side wall 12a have water repellency. In other words, the liquid that has been poured into the water tank 11 is overlaid on the upper surface of the water-repellent particle layer 13 whose perimeter is surrounded by the upper side wall 12a, and maintained as the liquid layer 15. The height of the liquid layer 15 (a liquid level of the liquid layer 15) is, for example, 1 mm to 50 cm. When the height of the liquid layer 15 is too great (for example, larger than 50 cm), it takes time to heat the liquid as described later. Thus, a great amount of heat capacity is needed, resulting in decreased efficiency of desalinating the liquid. On the other hand, when the height of the liquid layer 15 is too small (for example, smaller than 1 mm), the efficiency of desalinating the liquid is excessively reduced. Accordingly, the height of the liquid layer 15 within the above-noted numerical range makes it possible to keep an appropriate desalination efficiency.

As described above, the lateral surface of the water tank 11 is formed of the upper side wall 12a of the vessel, and the bottom surface thereof is formed of the water-repellent particle layer 13. The water tank 11 holds as the liquid layer 15 the liquid that has been introduced from an outside of the desalination apparatus 10.

It should be noted that the water tank 11 may include a heater for heating the liquid layer 15 in the water tank 11. In this case, the heater is disposed on the upper side wall 12a of the water tank 11, for example.

<Water-Repellent Particle Layer 13>

The water-repellent particle layer 13 is located below the water tank 11. The upper surface of the water-repellent particle layer 13 forms the bottom surface of the water tank 11. When the liquid is poured into the water tank 11, the water-repellent particle layer 13 is located in contact with the lower surface of the liquid layer 15. As shown in FIG. 3, a lateral surface of the water-repellent particle layer 13 may be surrounded by the lower side wall 12b.

The water-repellent particle layer 13 contains at least a plurality of water-repellent particles. Each of the water-repellent particles includes a particle and a water-repellent film that coats a particle surface. The water-repellent particles are particles whose surfaces have water repellency.

The water-repellent particle layer 13 is formed of a large number of the water-repellent particles that are clustered together. In other words, the surface of one water-repellent particle is in contact with the surfaces of other water-repellent particles. At this time, between the water-repellent particles that are in contact with each other, the water-repellent particle layer 13 has a gap through which the water vapor obtained by heating and evaporating the liquid can pass. Since the water-repellent particle layer 13 contains the plurality of water-repellent particles, it is possible to reduce the liquid entering the inside of the water-repellent particle layer 13.

The lower side wall 12b may surround the lateral surface of the water-repellent particle layer 13 entirely. The lower side wall 12b surrounds the lateral surface of the water-repellent particle layer 13, thereby reducing the liquid entering the inside of the water-repellent particle layer 13. However, since the plurality of water-repellent particles forming the water-repellent particle layer 13 also have water repellency, it is possible to reduce the liquid entering the inside of the water-repellent particle layer 13 even when the lower side wall 12b is not provided. Thus, it is not essential to provide the lower side wall 12b.

The particles include gravel, sand, silt and clay. The gravel corresponds to particles having a particle size of greater than 2 mm and not greater than 75 mm. The sand corresponds to particles having a particle size of greater than 0.075 mm and not greater than 2 mm. The silt corresponds to particles having a particle size of greater than 0.005 mm and not greater than 0.075 mm. The clay corresponds to particles having a particle size of not greater than 0.005 mm.

The water-repellent film coats the surface of each of the particles. The water-repellent film may include a fluorocarbon group represented by the chemical formula —$(CF_2)_n$—. Here, n is a natural number. For example, n ranges from 2 to 20.

The water-repellent film may be bound to the particle by a covalent bond. The following chemical formula (I) represents a favorable water-repellent film.

[Formula 1]

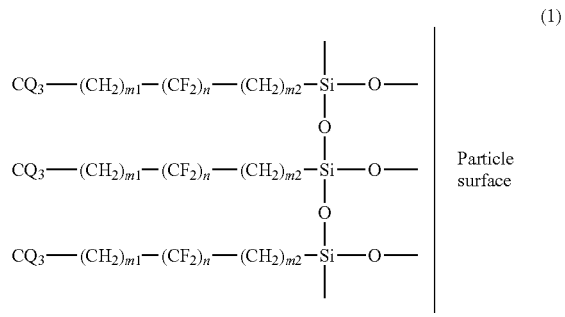

(1)

Here, Q represents hydrogen or fluorine. m1 and m2 represent zero or a natural number of not less than one, independently. Further, n ranges from 2 to 20.

In the following, an exemplary method for producing the water-repellent particles will be described.

First, a surfactant represented by the chemical formula $CX_3$—$(CH_2)_{m1}$—$(CF_2)_n$—$(CH_2)_{m2}$—$SiX_3$ is dissolved in a non-aqueous solvent to prepare a surfactant solution. X is halogen, optionally, chlorine.

Next, a plurality of particles are immersed in the surfactant solution in dry atmosphere to obtain a plurality of water-repellent particles (see Patent Literature: U.S. Pat. No. 5,270,080 (corresponding to Japanese Examined Patent Application Publication No. 07-063670)).

Furthermore, examples of the material for the water-repellent film include chlorosilane materials or alkoxysilane materials. The chlorosilane materials are, for example, heptadecafluoro-1,1,2,2-tetrahydrodecyltrichlorosilane or n-octadecyldimethylchlorosilane. The alkoxysilane materials are, for example, n-octadecyltrimethoxysilane or nonafluorohexyltriethoxysilane.

The water-repellent particle layer 13 may have low thermal conductivity so that heat conduction between the water tank 11 and the liquefying layer 14 is reduced. In the water tank 11, the liquid is heated and evaporated. Accordingly, the water tank 11 is kept at a predetermined temperature or higher (for example, from 40° C. to 80° C.). The liquefying layer 14 liquefies the water vapor. Accordingly, the liquefying layer 14 is kept at a predetermined temperature or lower (for example, 30° C. or lower). The difference in temperature between the water tank 11 and the liquefying layer 14 is at least 10° C. When the difference in temperature between the water tank 11 and the liquefying layer 14 is considerable and the thermal conductivity therebetween is high, the desalination efficiency may be reduced in some cases.

Since the water-repellent particle layer 13 is formed of the plurality of water-repellent particles that are clustered together, air is present between the plurality of particles. Thus, the water-repellent particle layer 13 has lower thermal conductivity than a film or the like formed of a uniform material.

The thickness of the water-repellent particle layer 13 is, for example, from 5 mm to 30 cm.

When the water-repellent particle layer 13 is too thin (e.g., has a thickness of less than 5 mm), there is a possibility that the water poured in the water tank 11 may fall down to the liquefying layer 14. On the other hand, the water-repellent particle layer 13 is too thick (e.g., has a thickness of greater than 30 cm), the water vapor described later cannot easily pass through the gap between particles in the water-repellent particle layer 13.

<Liquefying Layer 14>

The liquefying layer 14 is located below the water-repellent particle layer 13. The liquefying layer 14 may be formed of a plurality of particles including particles that have not been treated to be water repellent. Alternatively, the liquefying layer 14 may be a space surrounded by the lower side wall 12b and the base plate 12c.

The lateral portion of the liquefying layer 14 may be entirely surrounded by the lower side wall 12b and the bottom portion thereof may be covered with the base plate 12c, so that the vessel 12 can hold fresh water 16.

The water vapor that has left, the water-repellent particle layer 13 and reached the liquefying layer 14 after passing through the gap between the particles in the water-repellent particle layer 13 is liquefied in the liquefying layer 14 to become liquid water (fresh water 16). Details will be described later.

The liquefying layer 14 is cooled as necessary.

An exemplary cooling method is illustrated as follows. The liquefying layer 14 is cooled by placing at least a part of the liquefying layer 14 in the soil (in the ground). For example, the height of the interface between the liquefying layer 14 and the water-repellent particle layer 13 is brought to the same level as the earth's surface, thereby making the temperature of the liquefying layer 14 lower than that of the water-repellent particle layer 13.

Also, the liquefying layer 14 may include a cooling unit.

As described above, the liquefying layer 14 is located below the water-repellent particle layer 13, and liquefies by cooling the water vapor that has passed through the water-repellent particle layer 13. Here, the liquefying layer 14 is kept at a predetermined temperature or lower (for example, 15° C. or lower).

It should be noted that, at the interface between the liquefying layer 14 and the water-repellent particle layer 13, the desalination apparatus 10 may include a support layer such as a mesh, for example, for avoiding easy falling of the water-repellent particles in the water-repellent particle layer down to the liquefying layer 14.

[Desalination Method]

The following description will be directed to the desalination process carried out by the desalination apparatus 10 configured as above.

<Desalination Process>

Figure 4:
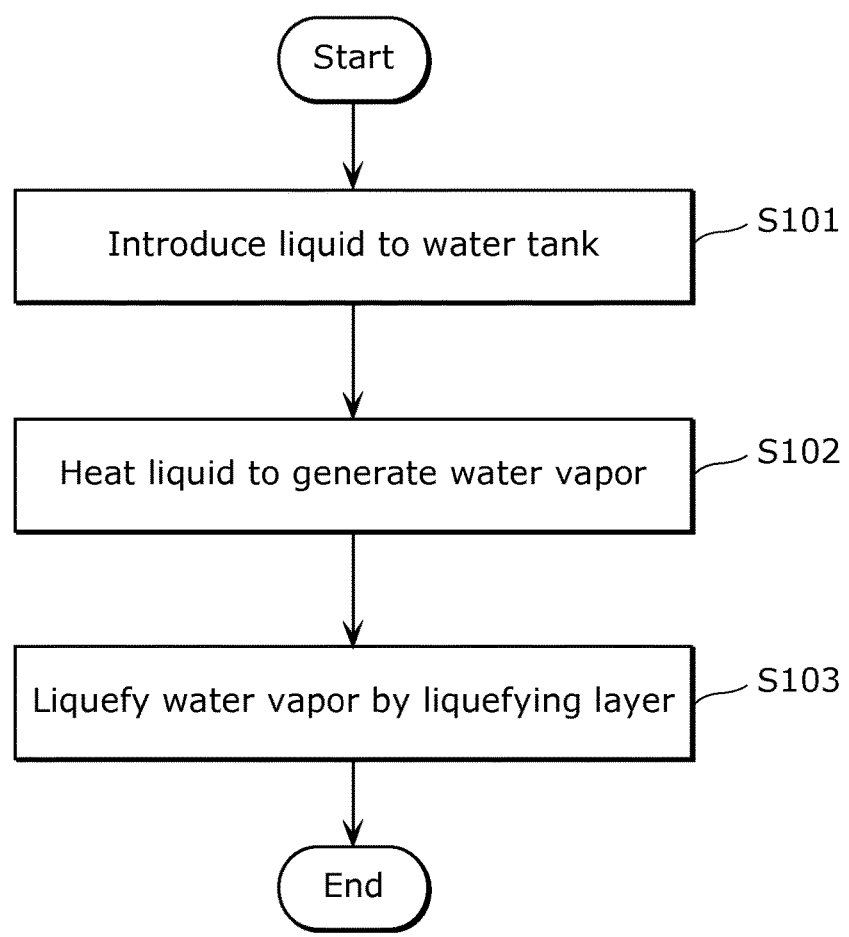
FIG. 4 is a flowchart illustrating steps of a desalination process of the desalination apparatus according to Embodiment 1.

FIG. 4 is a flowchart illustrating steps of the desalination process of the desalination apparatus 10.

First, the liquid is introduced to the water tank 11, and placed above the water-repellent particle layer 13 (to serve as the liquid layer 15) (S101). Here, the liquid is, for example, salt water.

Next, by heating and evaporating the liquid placed above the water-repellent particle layer 13, the water vapor is generated (S102). More specifically, when the liquid stored in the water tank 11 (the liquid layer 15) is heated to a temperature higher than or equal to a certain temperature, the liquid turns to the water vapor.

Incidentally, the above-noted certain temperature is determined according to a saturation vapor pressure curve based on the kind of the liquid and atmospheric pressure. For example, when the liquid is salt water, the certain temperature is from 50° C. to 60° C. The liquid layer 15 may be heated, for example, by sunlight or by a heater if the water tank 11 includes the heater. Alternatively, the liquid layer 15 may be heated by supplying a heated object into the liquid layer 15 in the water tank 11.

Subsequently, the water vapor is liquefied by the liquefying layer 14, thereby obtaining the fresh water (S103).

More specifically, the water vapor obtained by heating and evaporating the liquid in the water tank 11 moves not only upward but also downward. When the water vapor moving downward passes through the gap between the water-repellent particles in the water-repellent particle layer 13 and reaches the liquefying layer 14, it is liquefied by the liquefying layer 14 to become liquid water. In other words, the water vapor obtained by heating and evaporating the liquid in the water tank 11 is cooled in the liquefying layer 14 to become liquid water.

In this manner, the desalination process of the desalination apparatus 10 is performed.

It should be noted that the liquid water is water in which solids contained in the liquid that has been poured into the water tank 11 and impurities dissolved therein are reduced, and typically fresh water (distilled water). The impurities dissolved in the liquid are, for example, ions.

[Detailed Configuration of Water-Repellent Particle Layer 13]

Now, the detailed configuration of the water-repellent particle layer 13 in the desalination apparatus 10 according to the present embodiment will be described with reference to drawings.

As illustrated in FIG. 3, the water-repellent particle layer 13 included in the desalination apparatus 10 according to the present embodiment includes a first layer 13a, and a second layer 13b located below the first layer 13a. The first layer 13a forms the lower surface of the water tank 11.

FIG. 5 illustrates the detailed configuration of the water-repellent particle layer 13. More specifically, (a) in FIG. 5 is a sectional view schematically illustrating the configuration of the water-repellent particle layer 13, (b) in FIG. 5 is an enlarged side view illustrating a part of the first layer 13a, and (c) in FIG. 5 is an enlarged side view illustrating a part of the second layer 13b.

As illustrated in FIG. 5, the first layer 13a contains a plurality of first water-repellent particles 131, and the second layer 13b contains a plurality of second water-repellent particles 132. In other words, the first layer 13a is formed of the plurality of first water-repellent particles 131 that are clustered together, and the second layer 13b is formed of the plurality of second water-repellent particles 132 that are clustered together.

Here, the average particle size of the plurality of second water-repellent particles 132 is larger than that of the plurality of first water-repellent particles 131. The particle size may be a major axis diameter, a minor axis diameter or a unidirectional diameter of each of the water-repellent particles (the first water-repellent particles 131 or the second water-repellent particles 132), an equivalent diameter obtained by an image analysis, light shielding or the Coulter Principle, or an effective diameter obtained by sedimentation or scattering using laser diffraction. The average particle size is an average of particle sizes of the plurality of water-repellent particles that are measured or calculated by the same standard.

For example, the average particle size of the first water-repellent particles 131 is 200 μm, and the average particle size of the second water-repellent particles 132 is 500 μm. In this case, when d11 denotes the particle size of the first water-repellent particles 131, 0 μm<d11≤300 μm. When d12 denotes the particle size of the second water-repellent particles 132, 300 μm<d12≤1 mm.

The average particle size and the particle size distribution range of the first water-repellent particles 131 and those of the second water-repellent particles 132 are not limited to the above example, as long as the average particle size of the second water-repellent particles 132 is larger than that of the first water-repellent particles 131. For example, the average particle size of the first water-repellent particles 131 may be 150 μm, and the average particle size of the second water-repellent particles 132 may be 450 μm, with 0 μm<d11≤350 μm and 250 μm<d12≤1 mm being satisfied. In other words, at least a part of the particle size distribution range of the first water-repellent particles 131 may overlap at least a part of the particle size distribution range of the second water-repellent particles 132. However, it is appropriate that the standard deviation of the particle size distribution of the first water-repellent particles 131 be sufficiently smaller than the standard deviation of the particle size distribution of the second water-repellent particles 132, so that the particle size distribution range of the second water-repellent particles 132 does not include the particle size distribution range of the first water-repellent particles 131. Likewise, it is appropriate that the standard deviation of the particle size distribution of the second water-repellent particles 132 be sufficiently smaller than the standard deviation of the particle size distribution of the first water-repellent particles 131, so that the particle size distribution range of the first water-repellent particles 131 does not include the particle size distribution range of the second water-repellent particles 132. Furthermore, the median of the particle size distribution of the first water-repellent particles 131 may be smaller than the median of the particle size distribution of the second water-repellent particles 132.

The first layer 13a containing the first water-repellent particles 131 having a smaller average particle size and the second layer 13b containing the second water-repellent particles 132 having a larger average particle size as described above have the following properties.

FIG. 6 is a table indicating different properties of the water-repellent particle layer 13 with respect to different particle sizes of the plurality of water-repellent particles forming the water-repellent particle layer 13.

As illustrated in this figure, the water-repellent particle layer 13 has a property of having a higher water content with an increase in the particle size of the water-repellent particles. Here, the water content means an amount of water vapor and moisture that can be held per unit volume. The reason follows.

As described above, the water-repellent particle layer 13 is formed of the large number of water-repellent particles that are clustered together. At this time, a slight gap is formed between the plurality of water-repellent particles that are adjacent to each other. The water content of the water-repellent particle layer 13 is determined by the amount of water vapor and moisture that can enter this gap. When the particle size of the water-repellent particles is small, the above-noted gap is also small. On the other hand, when the particle size of the water-repellent particles is large, the above-noted gap is also large. Thus, the water-repellent particle layer 13 has a property of having a higher water content with an increase in the particle size of the water-repellent particles.

Furthermore, the water-repellent particle layer 13 exhibits more noticeable capillarity with a decrease in the particle size of the water-repellent particles (indicated as "high" in the table). In other words, the capillary force increases with a decrease in the particle size of the water-repellent particles. The reason follows.

As described in the section of Underlying Knowledge Forming Basis of the Present Disclosure, the capillarity occurs in the water-repellent particle layer 13 because the gaps formed inside the water-repellent particle layer 13 are strung together so as to form the fine tubes vertically extending inside the water-repellent particle layer 13. The horizontal cross-sectional area of these tubes is proportional to the volume of the gaps formed between the water-repellent particles that are adjacent to each other. As noted above, when the particle size of the water-repellent particles is small, the volume of the gap is also small. When the particle size of the water-repellent particles is large, the volume of the gap is also large. Accordingly, when the particle size of the water-repellent particles is small, the above-noted horizontal cross-sectional area of the gap is also small. When the particle size of the water-repellent particles is large, the above-noted horizontal cross-sectional area of the gap is also large. Thus, the capillary force in the water-repellent particle layer 13 increases with a decrease in the particle size of the water-repellent particles.

FIG. 6 indicates "high" for the capillarity (i.e., the capillary force is large) when the water drops on the lower surface of the water-repellent particle layer 13 deeply enter the inside of the water-repellent particle layer 13 by the capillarity, namely, the water drops (moisture) reach high with respect to the lower surface of the water-repellent particle layer 13, and "low" for the capillarity (i.e., the capillary force is small) when the water drops shallowly enter the inside of the water-repellent particle layer 13 by the capillarity.

In this way, with an increase in the particle size of the plurality of water-repellent particles forming the water-repellent particle layer 13, the water-repellent particle layer 13 has a larger water content and achieves reduced capillarity.

Thus, since the water-repellent particle layer 13 according to the present embodiment includes on its lower surface side the second layer 13b containing the second water-repellent particles 132 with a larger particle size, the two phenomena below can be achieved compared with the comparative example in which the water-repellent particle layer is formed entirely of the water-repellent particles with a smaller particle size.

First, compared with the water-repellent particle layer in the comparative example, the water-repellent particle layer 13 in the present embodiment can reduce the capillarity, so that the fresh water (moisture) generated on the lower surface does not enter the inside of the water-repellent particle layer 13 easily.

Second, compared with the water-repellent particle layer in the comparative example, the water-repellent particle layer 13 in the present embodiment has a higher water content, helping to prevent the fresh water (moisture) that has entered the inside of the water-repellent particle layer 13 by the capillarity from reaching an upper surface of the water-repellent particle layer 13.

Figure 7A:
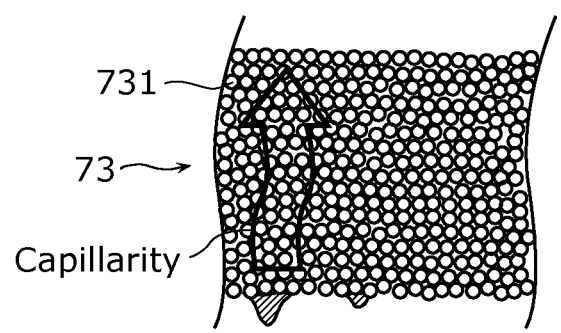
FIG. 7A schematically illustrates movement of fresh water in a water-repellent particle layer entirely formed of water-repellent particles having a small particle size.
Figure 7B:
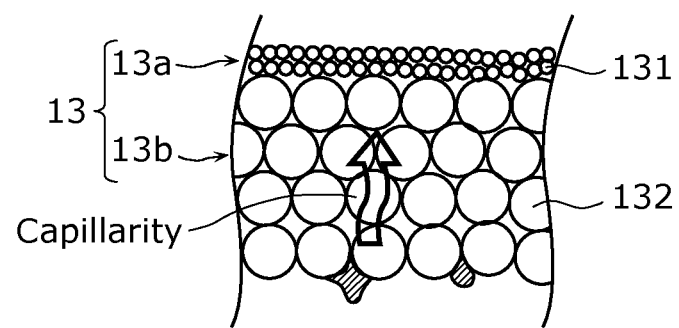
FIG. 7B schematically illustrates movement of fresh water in the water-repellent particle layer in Embodiment 1.

Concerning these two phenomena, the following is a description of how the fresh water generated on the lower surface of the water-repellent particle layer in the comparative example moves inside the water-repellent particle layer and how the fresh water generated on the lower surface of the water-repellent particle layer 13 in the present embodiment moves inside the water-repellent particle layer 13, with reference to FIGS. 7A and 7B.

As the comparative example of the present embodiment, FIG. 7A schematically illustrates the movement of the fresh water in the water-repellent particle layer 73 entirely formed of the water-repellent particles 731 with a smaller particle size. FIG. 7B schematically illustrates the movement of the fresh water in the water-repellent particle layer 13 in the present embodiment. In the description here, it is assumed that the particle size of the water-repellent particles 731 forming the water-repellent particle layer 73 illustrated in FIG. 7A and the particle size of the first water-repellent particles 131 forming the first layer 13a of the water-repellent particle layer 13 illustrated in FIG. 7B are substantially the same. Incidentally, in each of the embodiments and variation, the phrase "substantially the same" or "equivalent" means that there is an error of at most 10%, specifically at most 5%, and more specifically at most 3%.

As illustrated in FIG. 7A, when the water-repellent particle layer 73 is entirely formed of the water-repellent particles 731 with a small particle size, the capillary force of the water-repellent particle layer 73 is large, so that the fresh water generated on the lower surface of the water-repellent particle layer 73 easily enters the inside of the water-repellent particle layer 73. In other words, the moisture easily enters the inside of the water-repellent particle layer 73. Because of the low water content of the water-repellent particle layer 73 working synergistically with the capillarity thereof, the moisture that has once entered the inside of the water-repellent particle layer 73 enters the water-repellent particle layer 73 deeply from the lower surface. As a result, the moisture that has entered the inside of the water-repellent particle layer 73 sometimes reaches the upper surface of the water-repellent particle layer 73.

On the other hand, as illustrated in FIG. 7B, when the second layer 13b containing the second water-repellent particles 132 with a large particle size is provided on the lower surface side of the water-repellent particle layer 13, the capillary force of the water-repellent particle layer 13 is small, so that the fresh water generated on the lower surface of the water-repellent particle layer 13 less easily enters the inside of the water-repellent particle layer 13 compared with the comparative example. In other words, the moisture does not easily enter the inside of the water-repellent particle layer 13. Also, the moisture that has once entered the inside of the water-repellent particle layer 13 remains inside the second layer 13b owing to the large water content of the second layer 13b and does not easily reach the first layer 13a. As a result, the moisture that has entered the inside of the water-repellent particle layer 13 does not easily reach the upper surface of the water-repellent particle layer 13.

As described above, since the water-repellent particle layer 13 in the present embodiment includes on its lower surface side the second layer 13b having a higher water content and a smaller capillary force compared with the water-repellent particle layer in the comparative example, the moisture can enter the inside of the water-repellent particle layer 13 less easily, and the moisture that has entered the inside of the water-repellent particle layer 13 can reach the upper surface of the water-repellent particle layer 13 less easily. Thus, it is possible to suppress the formation of the water path in the water-repellent particle layer 13.

Incidentally, the water bearing pressure of the water-repellent particle layer 13 increases with a decrease in the particle size of the water-repellent particles contained in the layer that faces the water tank 11. Hereinafter, the water-repellent particle layer whose layer facing the water tank 11 contains the water-repellent particles with a large particle size will be described as a comparative example.

Figure 8A:
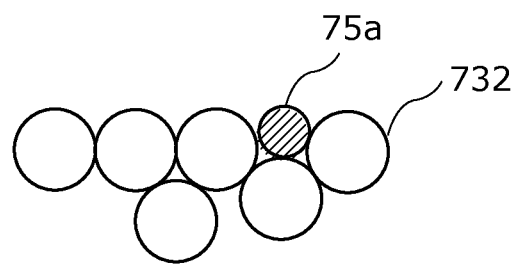
FIG. 8A schematically illustrates how a liquid is held by the water-repellent particle layer in the comparative example.
Figure 8B:
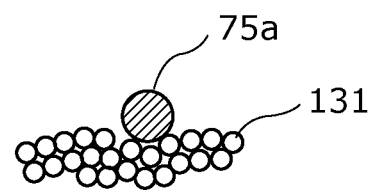
FIG. 8B schematically illustrates how a liquid is held by the water-repellent particle layer in Embodiment 1.

FIG. 8A schematically illustrates how the liquid is held by the water-repellent particle layer in the comparative example. FIG. 8B schematically illustrates how the liquid is held by the water-repellent particle layer 13 in the present embodiment. Here, the description will be directed to the case in which the particle size of the water-repellent particles 732 illustrated in FIG. 8A and the particle size of the second water-repellent particles 132 contained in the second layer 13b in the water-repellent particle layer 13 in the present embodiment are substantially the same. Also, the description will be directed to the case in which a minute amount of the liquid is stored in the water tank 11 and, by surface tension of this liquid, forms a substantially spherical liquid drop 75a.

As illustrated in FIG. 8A, when the liquid drop 75a is held by the layer containing the water-repellent particles 732 with a large particle size, the gap formed between the water-repellent particles 732 is large, so that the liquid drop 75a can pass through the gap easily. On the other hand, as illustrated in FIG. 8B, when the liquid drop 75a is held by the first water-repellent particles 131 with a small particle size, the gap formed between the first water-repellent particles 131 is small, so that the liquid drop 75a cannot pass through the gap easily.

As downward stress applied to the liquid drop 75a increases, this liquid drop 75a passes through the gap more easily. In other words, as the amount of the liquid stored in the water tank 11 increases, the liquid drop 75a passes through the gap more easily. Put another way, as the height of the liquid layer 15 formed by the liquid stored in the water tank 11 increases, the liquid drop 75a passes through the gap more easily.

Thus, the water-repellent particle layer 13 in the present embodiment includes the first layer 13a facing the water tank 11 and containing the first water-repellent particles 131 with a small particle size, thereby making it possible to secure water bearing pressure. The water bearing pressure to be secured by the water-repellent particle layer 13 is pressure applied to the water-repellent particle layer 13 when the liquid layer 15 is set to have a desired height (for example, 15 cm to 50 cm).

Here, in the present embodiment, the thickness (h1 in FIG. 3) of the water-repellent particle layer 13 including the first layer 13a and the second layer 13b may be substantially the same as the thickness (indicated by h7 herein) of the water-repellent particle layer 73 in the comparative example whose water-repellent particles have an equivalent particle size to the water-repellent particles contained in the first layer 13a. In this manner, the water-repellent particle layer 13 in the present embodiment can secure substantially the same water bearing pressure as the water-repellent particle layer 73 in the comparative example.

In other words, the layer containing the first water-repellent particles 131 with a small particle size in the present embodiment (the first layer 13a) may be thinner than the water-repellent particle layer 73 containing the water-repellent particles with a small particle size in the comparative example. Even in such a case, the water-repellent particle layer 13 in the present embodiment includes not only the first layer 13a but also the layer containing the second water-repellent particles 132 with a large particle size (the second layer 13b), thereby achieving h1=h7. In this manner, the water-repellent particle layer 13 in the present embodiment can secure substantially the same water bearing pressure as the water-repellent particle layer 73 in the comparative example.

As described above, the water-repellent particle layer 13 in the desalination apparatus 10 according to the present embodiment includes the first layer 13a that contains the plurality of first water-repellent particles 131 and faces the water tank 11, and the second layer 13b that contains the plurality of second water-repellent particles 132 and is provided below the first layer 13a. The average particle size of the plurality of second water-repellent particles 132 is larger than that of the plurality of first water-repellent particles 131.

The water-repellent particle layer 13 includes the second layer 13b that faces the liquefying layer 14 and contains the plurality of second water-repellent particles 132 with a larger average particle size as described above, so that the formation of the water path in the water-repellent particle layer 13 can be suppressed. This, as a result, helps to prevent the liquid in the liquid layer 15 that is not evaporated and remains in a liquid state from passing through the water path and thus flowing into the liquefying layer 14. In other words, it is possible to reduce the possibility that the desalination cannot be performed.

Furthermore, the water-repellent particle layer 13 includes the first layer 13a that faces the water tank 11 and contains the plurality of first water-repellent particles 131 with a small average particle size, so that the water bearing pressure can be secured.

FIGS. 9A to 9E are sectional views illustrating a major portion of the desalination apparatus for describing an example of how moisture moves in the water-repellent particle layer 13 in the above-described desalination apparatus 10 according to the present embodiment. In other words, the description will be directed to an example of how water drops (moisture) generated on the lower surface of the water-repellent particle layer 13 move in the water-repellent particle layer 13 with the progress of the desalination process. Incidentally, FIGS. 9A to 9E are enlarged sectional views illustrating the water-repellent particle layer 13 and the vicinity thereof in the desalination apparatus 10. Also, in the following, the water-repellent particle layer 73 in the comparative example will be described as containing the water-repellent particles with substantially the same particle size as the first water-repellent particles 131 in the first layer 13a in the present embodiment.

<FIG. 9A>

Figure 9A:
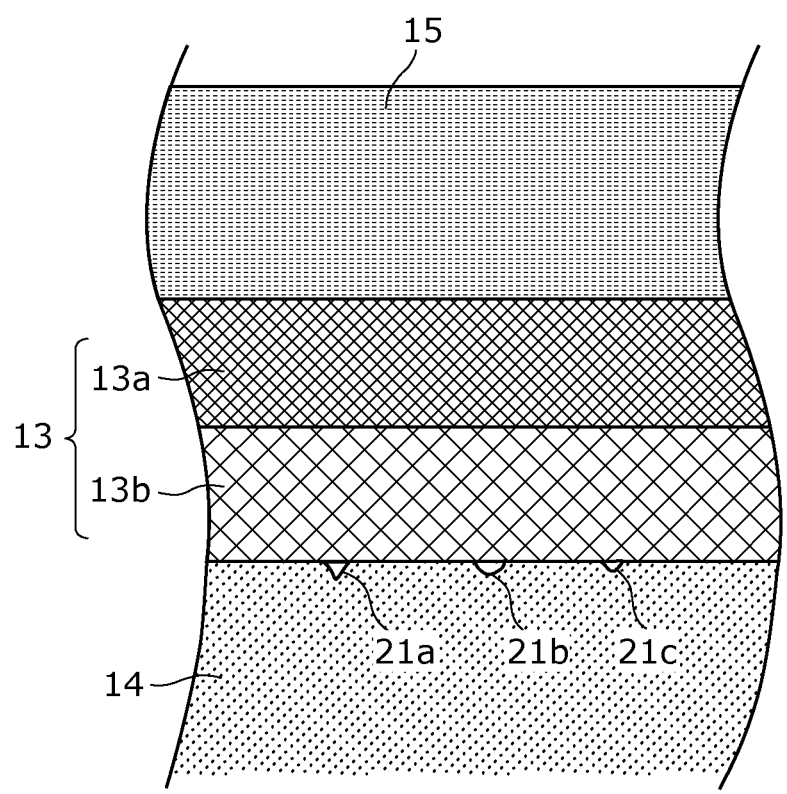
FIG. 9A is a sectional view illustrating a major portion of the desalination apparatus for describing an example of how moisture moves in the water-repellent particle layer in Embodiment 1.

FIG. 9A illustrates a state immediately after the desalination process is started and the fresh water is obtained in the desalination apparatus 10 according to the present embodiment.

As illustrated in this figure, the desalination process is started and the water vapor is liquefied by the liquefying layer 14, so that drops 21a to 21c of fresh water are obtained. Thus obtained fresh water drops to the bottom surface of the liquefying layer 14.

<FIG. 9B>

FIG. 9B illustrates how the fresh water generated on the lower surface of the second layer 13b in the state of FIG. 9A enters inside of the second layer 13b by a capillary force of the water-repellent particle layer 13.

At least a part of the water drops 21a to 21c generated on the lower surface of the second layer 13b sometimes enters the inside of the second layer 13b by capillary forces 22a to 22c of the second layer 13b. In other words, moisture enters the inside of the water-repellent particle layer 13 in some cases. The length of arrows indicated as the capillary forces 22a to 22c in the sheet of paper schematically illustrates how deep the moisture enters the water-repellent particle layer 13 by the capillary forces 22a to 22c.

As can be understood by comparing the capillary forces 22a to 22c illustrated in FIG. 9B and the capillary forces 92a to 92c illustrated in FIG. 2B, the former is smaller than the latter. In other words, the depth of the moisture from the water drops 21a to 21c generated on the lower surface of the second layer 13b entering the second layer 13b is smaller than that of the moisture from the water drops 91a to 91c generated on the lower surface of the water-repellent particle layer 73 entering the water-repellent particle layer 73 in the comparative example illustrated in FIG. 2B. This is because the capillary force of the second layer 13b containing the plurality of second water-repellent particles 132 with a large particle size is smaller than that of the water-repellent particle layer in the comparative example containing the plurality of water-repellent particles with a small particle size.

<FIG. 9C>

FIG. 9C schematically illustrates how the water-repellent particles inside the second layer 13b are dampened by the moisture that has entered the inside of the second layer 13b of the water-repellent particle layer 13 illustrated in FIG. 9B.

As illustrated in this figure, the moisture that has entered the inside of the second layer 13b by the capillarity condenses inside the second layer 13b and raises the humidity inside the second layer 13b. In other words, the moisture dampens the second water-repellent particles 132 inside the second layer 13b. Accordingly, groups 23a to 23c of damp water-repellent particles are present inside the second layer 13b of the water-repellent particle layer 13.

<FIG. 9D>

Figure 9D:
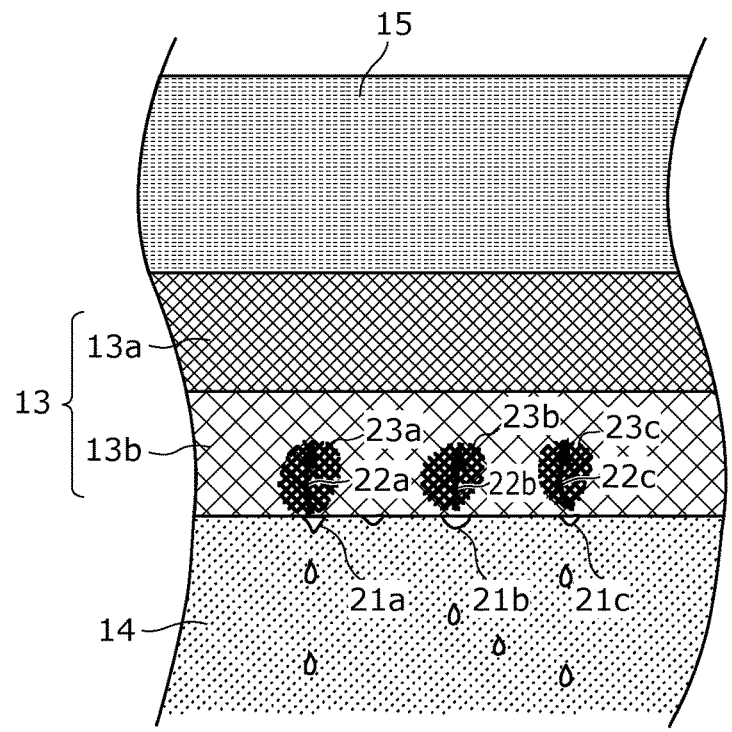
FIG. 9D is a sectional view illustrating the major portion of the desalination apparatus for describing an example of how the moisture moves in the water-repellent particle layer in Embodiment

FIG. 9D schematically illustrates how the second water-repellent particles 132 inside the second layer 13b of the water-repellent particle layer 13 are further dampened after further progress of the desalination process from the state of FIG. 9C.

As illustrated in this figure, with the further progress of the desalination process, the second water-repellent particles 132 inside the second layer 13b are dampened further. At this time, although the groups 93a to 93c of the damp water-repellent particles are enlarged immediately in the water-repellent particle layer 73 in the comparative example, the groups 23a to 23c of the damp water-repellent particles in the second layer 13b of the water-repellent particle layer 13 in the present embodiment are enlarged more slowly than those in the comparative example. This is because the second layer 13b containing the plurality of second water-repellent particles 132 with a larger particle size has a higher water content than the water-repellent particle layer 73 in the comparative example containing the plurality of water-repellent particles with a smaller particle size. In other words, the water content of the groups 23a to 23c of damp water-repellent particles in the second layer 13b is higher.

In this manner, compared with the water-repellent particle layer 73 in the comparative example, the enlargement of the groups 23a to 23c of damp water-repellent particles can be suppressed in the second layer 13b.

<FIG. 9E>

Figure 9E:
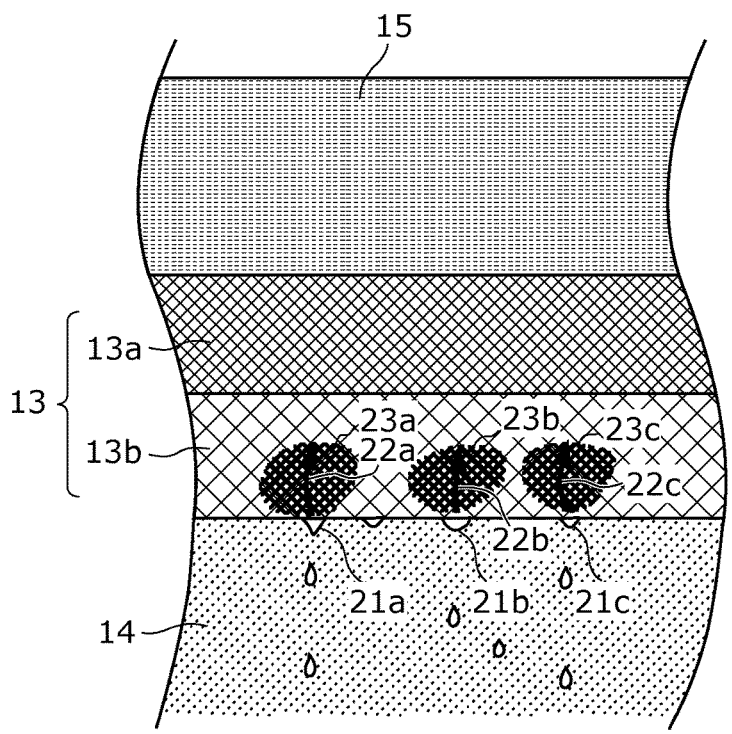
FIG. 9E is a sectional view illustrating the major portion of the desalination apparatus for describing an example of how the moisture moves in the water-repellent particle layer in Embodiment 1.

FIG. 9E schematically illustrates how the second water-repellent particles 132 inside the second layer 13b of the water-repellent particle layer 13 are further dampened after further progress of the desalination process from the state of FIG. 9D.

As illustrated in this figure, with the further progress of the desalination process, the second water-repellent particles 132 inside the second layer 13b are dampened further, and the number of the damp second water-repellent particles 132 increases. In other words, the groups 23a to 23c of the damp water-repellent particles are enlarged. However, the groups 23a to 23c of damp water-repellent particles do not easily reach an upper surface of the second layer 13b. This is because the second layer 13b containing the plurality of second water-repellent particles 132 with a large particle size has a higher water content and a lower capillarity than the water-repellent particle layer 73 in the comparative example containing the plurality of water-repellent particles with a small particle size.

Thus, it is possible to suppress the vertical penetration of the groups 23a to 23c of damp water-repellent particles through the second layer 13b. In other words, the second layer 13b makes it possible to suppress the formation of the groups of damp water-repellent particles vertically penetrating the water-repellent particle layer 13.

Thus, the water-repellent particle layer 13 in the present embodiment makes it possible to suppress the formation of the water path vertically penetrating the water-repellent particle layer 13. This, as a result, helps to prevent the liquid in the liquid layer 15 that is not evaporated and remains in a liquid state from moving through the water path and thus flowing into the liquefying layer 14. In other words, it is possible to reduce the possibility that the desalination cannot be performed.

(Variation of Embodiment 1)

Now, a desalination apparatus according to a variation of Embodiment 1 in the present disclosure will be described. The desalination apparatus according to the present variation is different from the desalination apparatus 10 according to Embodiment 1 in that a water-repellent particle layer 33 includes three layers with different average particle sizes. The following description will be mainly directed to how the desalination apparatus according to the present variation is different from the desalination apparatus 10 according to Embodiment 1.

Figure 10A:
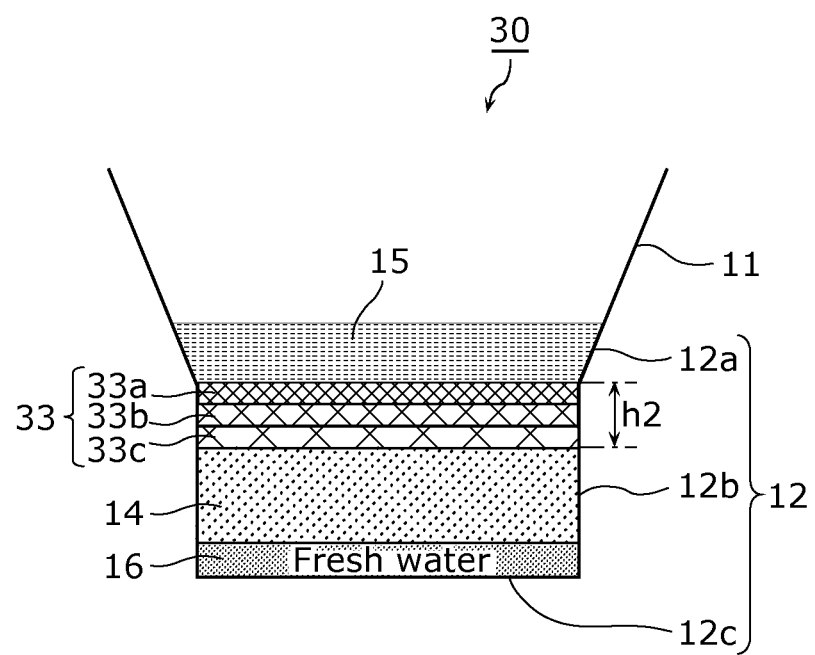
FIG. 10A is a sectional view illustrating a configuration of a desalination apparatus according to a variation of Embodiment 1.

FIG. 10A is a sectional view illustrating a configuration of the desalination apparatus according to the present variation.

As illustrated in this figure, in the desalination apparatus 30 according to the present variation, the water-repellent particle layer 33 includes a first layer 33a facing the water tank 11, a second layer 33b provided below the first layer 33a, and a third layer 33c provided below the second layer 33b. The thickness h2 of this water-repellent particle layer 33 is substantially the same as the thickness h1 of the water-repellent particle layer 13 in Embodiment 1.

Figure 10B:
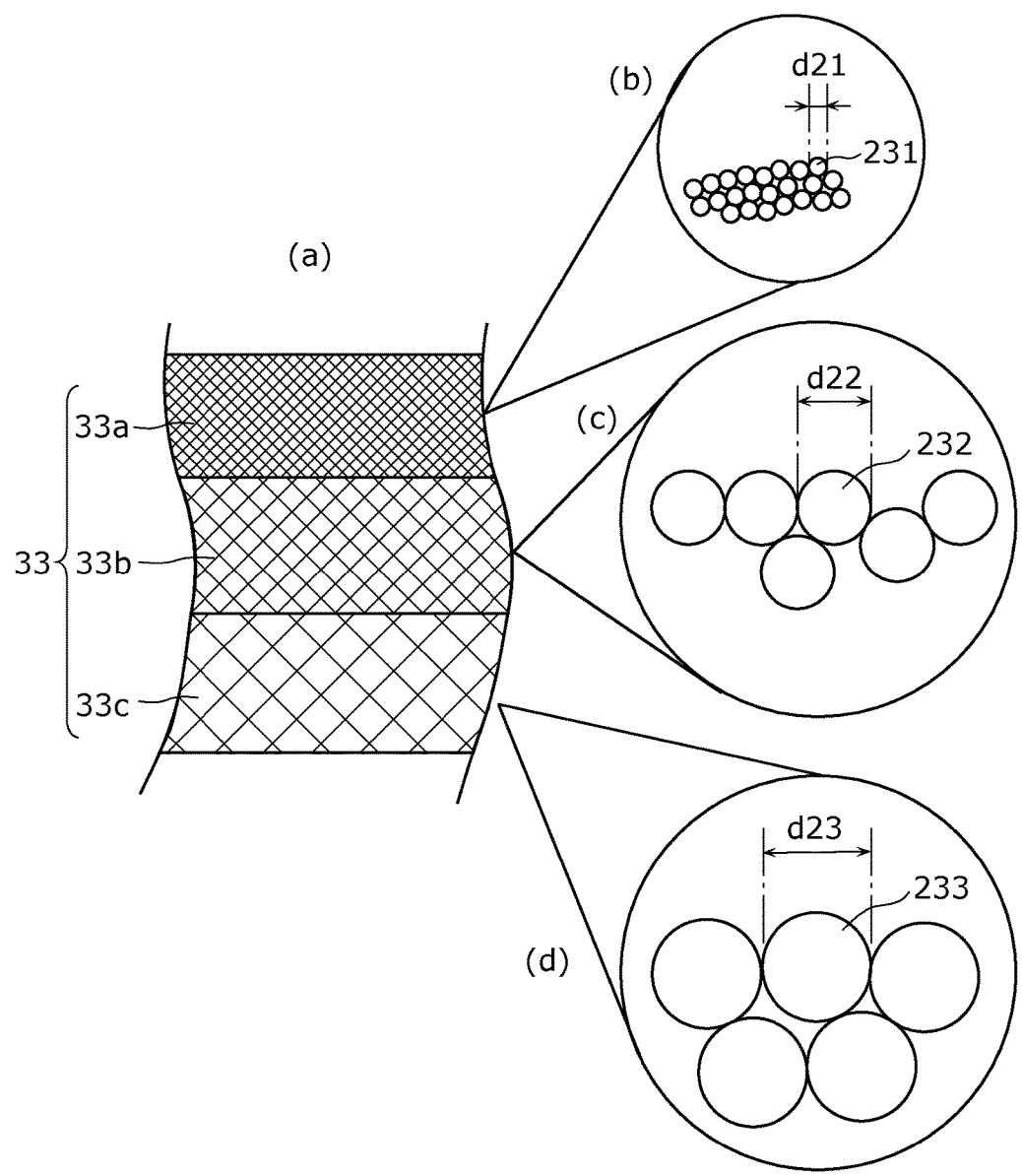
FIG. 10B illustrates a detailed configuration of a water-repellent particle layer in a variation of Embodiment 1.

FIG. 10B illustrates a detailed configuration of the water-repellent particle layer 33, with (a) being a sectional view schematically illustrating the configuration of the water-repellent particle layer 33, (b) being an enlarged side view illustrating a part of the first layer 33a, (c) being an enlarged side view illustrating a part of the second layer 33b, and (d) being an enlarged side view illustrating a part of the third layer 33c.

As illustrated in FIG. 10B, the first layer 33a contains a plurality of first water-repellent particles 231, the second layer 33b contains a plurality of second water-repellent particles 232, and the third layer 33c contains a plurality of third water-repellent particles 233. In other words, the first layer 33a is formed of the plurality of first water-repellent particles 231 that are clustered together, the second layer 33b is formed of the plurality of second water-repellent particles 232 that are clustered together, and the third layer 33c is formed of the plurality of third water-repellent particles 233 that are clustered together.

Here, the average particle size of the plurality of third water-repellent particles 233 is larger than that of the plurality of second water-repellent particles 232, and the average particle size of the plurality of second water-repellent particles 232 is larger than that of the plurality of first water-repellent particles 231.

More specifically, the first water-repellent particles 231 correspond to the first water-repellent particles 131 in Embodiment 1, the second water-repellent particles 232 correspond to the water-repellent particles with a small particle size among the second water-repellent particles 132 in Embodiment 1, and the third water-repellent particles 233 correspond to the water-repellent particles with a large particle size among the second water-repellent particles 132 in Embodiment 1.

As described above, the water-repellent particle layer 33 in the present variation contains on its lower surface side the plurality of third water-repellent particles 233 with a still larger average particle size compared with the water-repellent particle layer 13 in Embodiment 1. This makes it possible to further reduce the capillary force of the lower portion (the third layer 33c) of the water-repellent particle layer 33, so that water drops generated on the lower surface of the water-repellent particle layer 33 enter the inside of the water-repellent particle layer 33 by the capillarity still less easily.

Moreover, since the water-repellent particle layer 33 in the present variation includes the first layer 33a facing the water tank 11 and containing the first water-repellent particles 231 with a small particle size, the water bearing pressure equivalent to that of the water-repellent particle layer 13 in Embodiment 1 can be secured by making the thickness h2 of the water-repellent particle layer 33 substantially the same as the thickness h1 of the water-repellent particle layer 13 in Embodiment 1.

For example, the average particle size of the first water-repellent particles 231 is 200 μm, the average particle size of the second water-repellent particles 232 is 500 μm, and the average particle size of the third water-repellent particles 233 is 800 μm. In this case, when d21 denotes the particle size of the first water-repellent particles 231, 0 μm<d21≤300 μm. When d22 denotes the particle size of the second water-repellent particles 232, 300 μm<d22≤700 μm. When d23 denotes the particle size of the third water-repellent particles 233, 700 μm<d23≤1 mm.

The average particle size and the particle size distribution range of the first water-repellent particles 231, those of the second water-repellent particles 232 and those of the third water-repellent particles 233 are not limited to the above example, as long as the average particle size of the third water-repellent particles 233 is larger than that of the second water-repellent particles 232 and the average particle size of the second water-repellent particles 232 is larger than that of the first water-repellent particles 231. For example, the average particle size of the first water-repellent particles 231 may be 150 μm, the average particle size of the second water-repellent particles 232 may be 450 μm, and the average particle size of the third water-repellent particles 233 may be 900 μm, with 0 μm<d21≤350 μm, 250 μm<d22≤800 μm and 600 μm<d23≤1 mm being satisfied. In other words, at least a part of the particle size distribution range of one kind of the water-repellent particles (one kind of the first water-repellent particles 231, the second water-repellent particles 232 and the third water-repellent particles 233) may overlap at least a part of the particle size distribution range of another kind of the water-repellent particles. However, it is appropriate that the standard deviation of the particle size distribution of one kind of the water-repellent particles be sufficiently smaller than the standard deviation of the particle size distribution of another kind of the water-repellent particles, so that the particle size distribution range of the latter water-repellent particles does not include the particle size distribution range of the former water-repellent particles. Furthermore, the median of the particle size distribution of the first water-repellent particles 231 may be smaller than the median of the particle size distribution of the second water-repellent particles 232, and the median of the particle size distribution of the second water-repellent particles 232 may be smaller than the median of the particle size distribution of the third water-repellent particles 233.

As described above, since the water-repellent particle layer 33 in the present variation includes on its lower surface side the third layer 33c having a higher water content and a lower capillarity than the water-repellent particle layer 13 in Embodiment 1, the fresh water generated on the lower surface can enter the inside of the water-repellent particle layer 33 still less easily, and the fresh water that has entered the inside of the water-repellent particle layer 33 can reach the upper surface of the water-repellent particle layer 33 still less easily. Thus, it is possible to even further suppress the formation of the water path in the water-repellent particle layer 33.

Embodiment 2

Now, a desalination apparatus according to Embodiment 2 in the present disclosure will be described. The desalination apparatus according to the present embodiment is different from the desalination apparatus 10 according to Embodiment 1 in that its water-repellent particle layer is a stack of layer sets each including a first layer containing water-repellent particles with a small average particle size and a second layer containing water-repellent particles with a large average particle size. The following description will be mainly directed to how the desalination apparatus according to the present embodiment is different from the desalination apparatus 10 according to Embodiment 1.

Figure 11A:
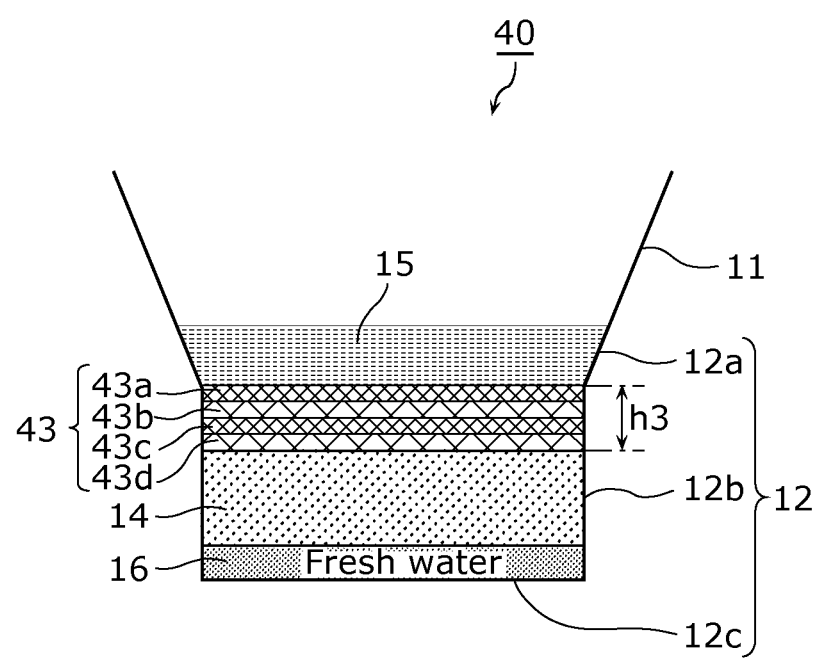
FIG. 11A is a sectional view illustrating a configuration of a desalination apparatus according to Embodiment 2.

FIG. 11A is a sectional view illustrating a configuration of the desalination apparatus according to the present embodiment.

As illustrated in this figure, in a desalination apparatus 40 according to the present embodiment, a water-repellent particle layer 43 includes a first layer 43a facing a water tank 11, a second layer 43b provided below the first layer 43a, a third layer 43c provided below the second layer 43b, and a fourth layer 43d provided below the third layer 43c. The thickness h3 of this water-repellent particle layer 43 is substantially the same as the thickness h1 of the water-repellent particle layer 13 in Embodiment 1.

Figure 11B:
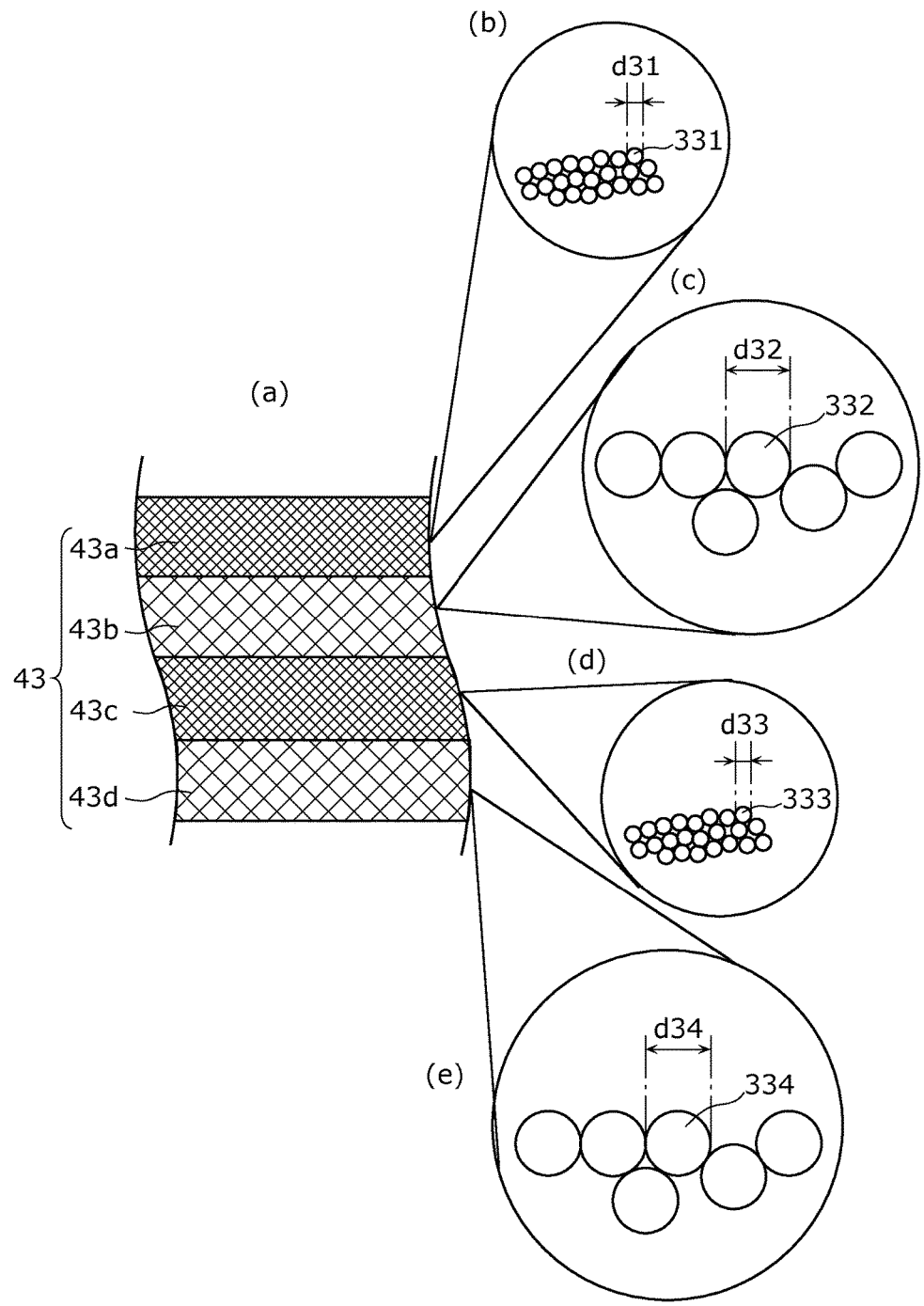
FIG. 11B illustrates a detailed configuration of a water-repellent particle layer in Embodiment 2.

FIG. 11B illustrates a detailed configuration of the water-repellent particle layer 43, with (a) being a sectional view schematically illustrating the configuration of the water-repellent particle layer 43, (b) being an enlarged side view illustrating a part of the first layer 43a, (c) being an enlarged side view illustrating a part of the second layer 43b, and (d) being an enlarged side view illustrating a part of the third layer 43c.

As illustrated in FIG. 11B, the first layer 43a contains a plurality of first water-repellent particles 331, the second layer 43b contains a plurality of second water-repellent particles 332, the third layer 43c contains a plurality of third water-repellent particles 333, and the fourth layer 43d contains a plurality of fourth water-repellent particles 334. In other words, the first layer 43a is formed of the plurality of first water-repellent particles 331 that are clustered together, the second layer 43b is formed of the plurality of second water-repellent particles 332 that are clustered together, the third layer 43c is formed of the plurality of third water-repellent particles 333 that are clustered together, and the fourth layer 43d is formed of the plurality of fourth water-repellent particles 334 that are clustered together.

Here, the average particle size and the particle size distribution of the plurality of first water-repellent particles 331 contained in the first layer 43a are substantially the same as those of the plurality of third water-repellent particles 333 contained in the third layer 43c. In other words, when d31 denotes the particle size of the first water-repellent particles 331 and d33 denotes the particle size of the third water-repellent particles 333, d31=d33. Also, the average particle size and the particle size distribution of the plurality of second water-repellent particles 332 contained in the second layer 43b are substantially the same as those of the plurality of fourth water-repellent particles 334 contained in the fourth layer 43d. In other words, when d32 denotes the particle size of the second water-repellent particles 332 and d34 denotes the particle size of the fourth water-repellent particles 334, d32=d34. Accordingly, it can be said that the water-repellent particle layer 43 in the present embodiment is a stack of two layer sets each including the first layer 43a and the second layer 43b.

Furthermore, the first water-repellent particles 331 and the third water-repellent particles 333 correspond to the first water-repellent particles 131 in Embodiment 1, and the second water-repellent particles 332 and the fourth water-repellent particles 334 correspond to the second water-repellent particles 132 in Embodiment 1.

In this way, the desalination apparatus 40 according to the present embodiment produces an effect similar to the desalination apparatus 10 according to Embodiment 1. That is to say, the water-repellent particle layer 43 includes the fourth layer 43d facing the liquefying layer 14 and containing the plurality of fourth water-repellent particles with a larger average particle size, so that the formation of the water path in the water-repellent particle layer 43 can be suppressed. As a result, the possibility that the liquid cannot be desalinated can be reduced. Furthermore, the water-repellent particle layer 43 includes the first layer 43a facing the water tank 11 and containing the plurality of first water-repellent particles 331 with a small average particle size, thereby making it possible to secure the water bearing pressure equivalent to the water-repellent particle layer 13 in Embodiment 1.

FIGS. 12A to 12D are sectional views illustrating a major portion of the desalination apparatus for describing an example of how moisture moves in the water-repellent particle layer 43 in the above-described desalination apparatus 40 according to the present embodiment. In other words, the description will be directed to an example of how water drops (moisture) generated on the lower surface of the water-repellent particle layer 43 move in the water-repellent particle layer 43 with the progress of the desalination process. Incidentally, FIGS. 12A to 12D are enlarged sectional views illustrating the water-repellent particle layer 43 and the vicinity thereof in the desalination apparatus 40.

<FIG. 12A>

Figure 12A:
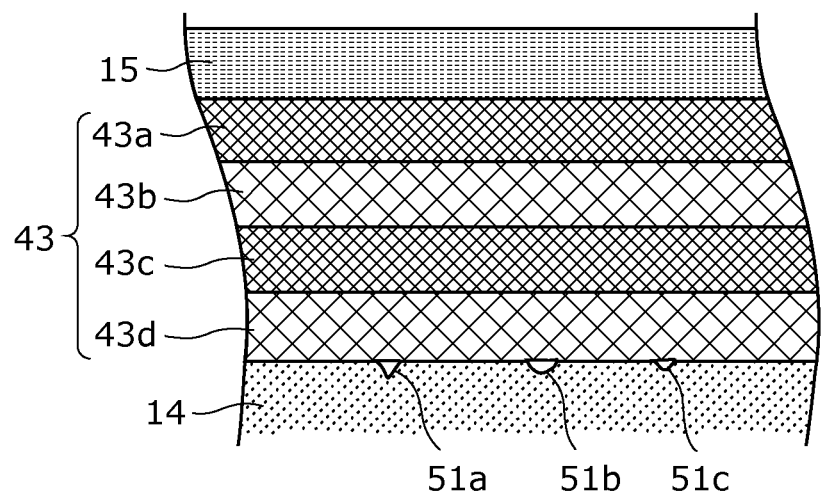
FIG. 12A is a sectional view illustrating a major portion of the desalination apparatus for describing an example of how moisture moves in the water-repellent particle layer in Embodiment 2.

FIG. 12A illustrates a state immediately after the desalination process is started and the fresh water is obtained in the desalination apparatus 40 according to the present embodiment.

As illustrated in this figure, the desalination process is started and the water vapor is liquefied by the liquefying layer 14, so that drops 51a to 51c of fresh water are obtained. Thus obtained fresh water drops to the bottom surface of the liquefying layer 14.

<FIG. 12B>

Figure 12B:
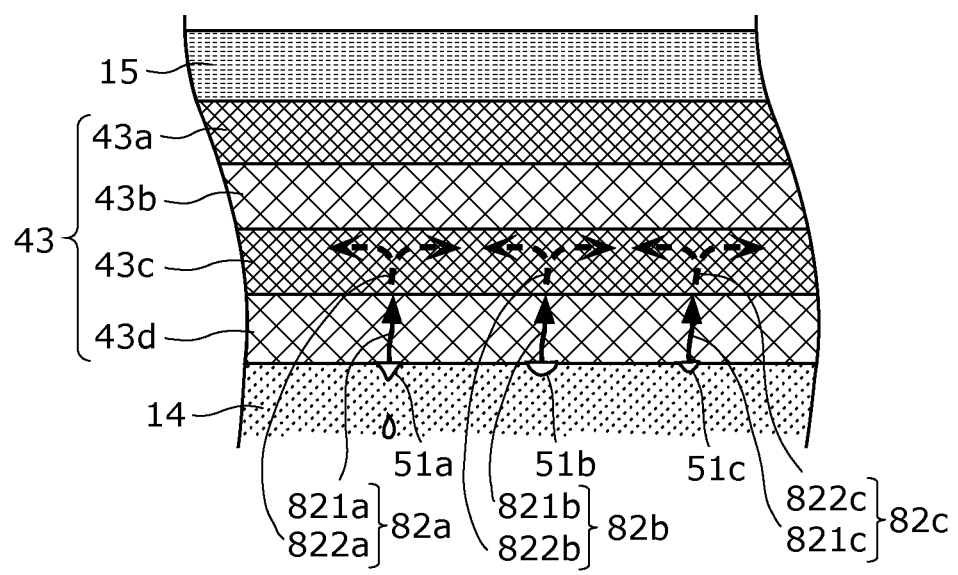
FIG. 12B is a sectional view illustrating the major portion of the desalination apparatus for describing an example of how the moisture moves in the water-repellent particle layer in Embodiment 2.

FIG. 12B illustrates how the fresh water generated on a lower surface of the fourth layer 43d in the state of FIG. 12A enters inside of the water-repellent particle layer 43 by a capillary force of the water-repellent particle layer 43.

At least a part of the water drops 51a to 51c generated on the lower surface of the fourth layer 43d of the water-repellent particle layer 43 sometimes enters the inside of the water-repellent particle layer 43 by capillary forces 82a to 82c of the water-repellent particle layer 43. In other words, moisture enters the inside of the water-repellent particle layer 43 in some cases.

More specifically, at least a part of the water drops 51a to 51c generated on the lower surface of the fourth layer 43d sometimes enters the inside of the fourth layer 43d by capillary forces 821a to 821c of the fourth layer 43d. Also, the moisture that has penetrated the fourth layer 43d and reached an interface between the third layer 43c and the fourth layer 43d sometimes enters the third layer 43c by capillary forces 822a to 822c of the third layer 43c.

The length of arrows indicated as the capillary forces 821a to 821c and 822a to 822c in the sheet of paper schematically illustrates how deep the moisture enters the third layer 43c and the fourth layer 43d by the capillary forces 821a to 821c and 822a to 822c.

Here, when attention is drawn to the capillary forces 822a to 822c of the third layer 43c, it is understood that forces along the interface between the third layer 43c and the second layer 43b are dominant near that interface. This is because, since the average particle size of the plurality of second water-repellent particles 332 contained in the second layer 43b is larger than that of the plurality of third water-repellent particles 333 contained in the third layer 43c, the capillary force of the third layer 43c is larger than that of the second layer 43b.

Consequently, the moisture that has entered the third layer 43c and reached near the interface between the third layer 43c and the second layer 43b does not move toward the second layer 43b but spreads inside the third layer 43c along that interface. As described above, the second layer 43b in the present embodiment serves as a barrier layer (a capillary barrier) that helps to prevent the moisture that has entered the inside of the water-repellent particle layer 43 from reaching the first layer 43a.

<FIG. 12C>

Figure 12C:
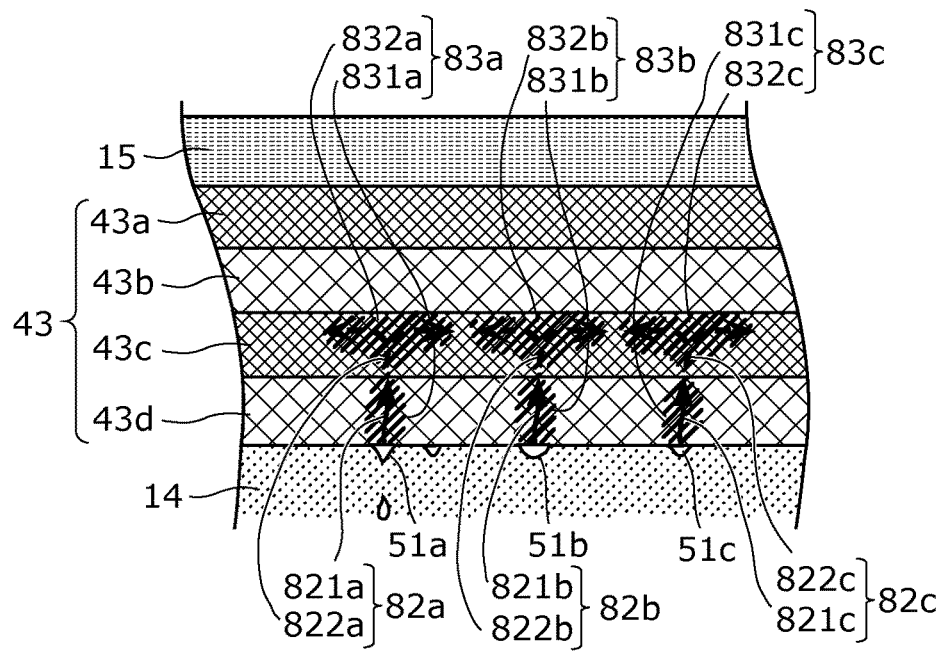
FIG. 12C is a sectional view illustrating the major portion of the desalination apparatus for describing an example of how the moisture moves in the water-repellent particle layer in Embodiment 2.

FIG. 12C schematically illustrates how the water-repellent particles inside the third layer 43c and the fourth layer 43d are dampened by the moisture that has entered the inside of the water-repellent particle layer 43 illustrated in FIG. 12B.

As illustrated in this figure, owing to the moisture that has entered the inside of the water-repellent particle layer 43 by the capillarity, groups 83a to 83c of damp water-repellent particles are present inside the water-repellent particle layer 43. More specifically, groups 831a to 831c of damp water-repellent particles are present inside the fourth layer 43d, and groups 832a to 832c of damp water-repellent particles are present inside the third layer 43c.

<FIG. 12D>

Figure 12D:
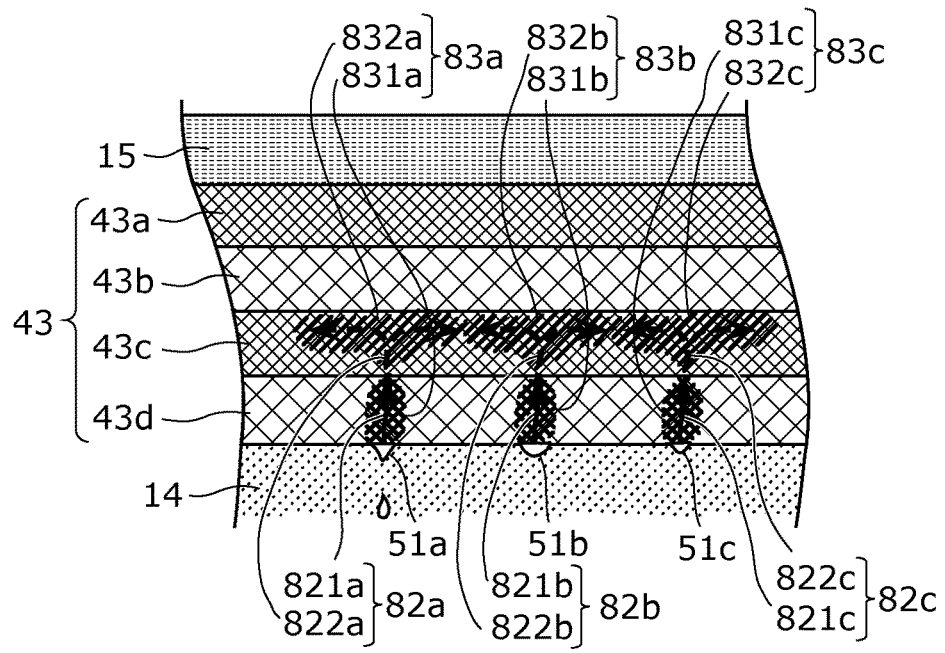
FIG. 12D is a sectional view illustrating the major portion of the desalination apparatus for describing an example of how the moisture moves in the water-repellent particle layer in Embodiment 2.

FIG. 12D schematically illustrates how the water-repellent particles inside the third layer 43c and the fourth layer 43d are further dampened after further progress of the desalination process from the state of FIG. 12C.

As illustrated in this figure, with the further progress of the desalination process, the fourth water-repellent particles 334 inside the fourth layer 43d are dampened further. In other words, the water content of the groups 831a to 831c of damp water-repellent particles inside the fourth layer 43d increases. Furthermore, since the third water-repellent particles 333 inside the third layer 43c are dampened further, the groups 832a to 832c of damp water-repellent particles spread along the interface between the third layer 43c and the second layer 43b near that interface.

However, since the second layer 43b is provided, the groups 83a to 83c of damp water-repellent particles do not easily reach a lower surface of the first layer 43a. This is because the second layer 43b helps to prevent the moisture that has entered the inside of the water-repellent particle layer 43 from reaching the first layer 43a as described above.

Consequently, the water-repellent particle layer 43 in the present embodiment produces an effect similar to the water-repellent particle layer 13 in Embodiment 1. That is to say, the formation of the water path vertically penetrating the water-repellent particle layer 43 can be suppressed. This, as a result, helps to prevent the liquid in the liquid layer 15 that is not evaporated and remains in a liquid state from passing through the water path and thus flowing into the liquefying layer 14. In other words, it is possible to reduce the possibility that the desalination cannot be performed.

Although the desalination apparatus and the desalination method according to one or more aspects of the present disclosure have been described above based on embodiments, the present disclosure is by no means limited to these embodiments. As long as not departing from the purport of the present disclosure, many variations of the above embodiments conceivable by a person skilled in the art and modes configured by the combination of the structural components in different embodiments may be included in the scope of one or more aspects of the present disclosure.

For example, the desalination apparatus may include a lid that is provided in the water tank 11 and covers the opening of the water tank 11 (the upper side wall 12a). This lid is formed of a transparent member when the liquid layer 15 of the desalination apparatus is heated by sunlight. The desalination apparatus includes the lid, whereby it is possible to not only reduce the water vapor upwardly escaping from the water tank 11 but also reduce the impurities entering through the opening of the water tank 11.

Moreover, although the individual layers in the water-repellent particle layer have equal thicknesses in the above description, there is no particular limitation to this. For example, the individual layers may be thinner toward the upper surface of the water-repellent particle layer (toward the layer facing the water tank 11), and vice versa.

Also, any number of the layers may be included in the water-repellent particle layer.

Furthermore, a separation sheet or the like for inhibiting the movement of particles between the plurality of layers included in the water-repellent particle layer may be disposed between these layers.

Additionally, within each of the plurality of layers included in the water-repellent particle layer, the water-repellent particles with a smaller particle size may be located toward the upper surface of the layer, and those with a larger particle size may be located toward the lower surface of the layer. In other words, in the entire water-repellent particle layer, the water-repellent particles with a smaller particle size may be located toward the upper surface of the layer, and those with a larger particle size may be located toward the lower surface of the layer.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

The desalination apparatus and the desalination method according to one or more exemplary embodiments disclosed herein are applicable to a desalination apparatus and a desalination method that desalinate seawater or distill a liquid by removing impurities that may be deposited as salt.

The invention claimed is:

1. A desalination apparatus that obtains fresh water from a liquid, the desalination apparatus comprising:
   a tank for storing a liquid in a reservoir layer;
   a water-repellent particle layer that is located at a bottom portion of the tank, the water repellent particle layer including a plurality of water-repellent particles that allow passage of water vapor generated by evaporation of the liquid stored in the reservoir layer, wherein each of the water-repellent particles includes a particle and a water-repellent film; and
   a plurality of particles forming a liquefying layer that is located below the water-repellent particle layer, the liquefying layer being capable of liquefying the water vapor that has passed through the water-repellent particle layer to obtain the fresh water,
   wherein the water-repellent particle layer includes:
   a first layer that contains a plurality of first water-repellent particles among the plurality of water-repellent particles, and faces the reservoir layer; and
   a second layer that contains a plurality of second water-repellent particles among the plurality of water-repellent particles, and is provided below the first layer, and
   an average particle size of the plurality of second water-repellent particles is larger than an average particle size of the plurality of first water-repellent particles.

2. The desalination apparatus according to claim 1, wherein the water-repellent particle layer further includes a third layer that contains a plurality of third water-repellent particles among the plurality of water-repellent particles, and is provided below the second layer, and an average particle size of the plurality of third water-repellent particles is larger than the average particle size of the plurality of second water-repellent particles.

3. The desalination apparatus according to claim 1, wherein the water-repellent particle layer is a stack of layer sets each including the first layer and the second layer.

4. A desalination method for obtaining fresh water from a liquid using a desalination apparatus, which is the desalination apparatus according to claim 1, wherein the desalination apparatus further includes a lid on an opening of the tank, the desalination method comprising:
 introducing the liquid to the reservoir layer to place the liquid above the water-repellent particle layer;
 heating and evaporating the liquid placed above the water-repellent particle layer to generate water vapor; and
 liquefying the water vapor by the liquefying layer to obtain the fresh water.

5. A desalination method for obtaining fresh water from a liquid using a desalination apparatus, which is the desalination apparatus according to claim 1, the desalination method comprising:
 introducing the liquid to the reservoir layer to place the liquid above the water-repellent particle layer; and
 heating and evaporating the liquid placed above the water-repellent particle layer to generate water vapor.

* * * * *